United States Patent
Fix et al.

(10) Patent No.: US 10,445,860 B2
(45) Date of Patent: Oct. 15, 2019

(54) AUTOFOCUS VIRTUAL REALITY HEADSET

(71) Applicant: Facebook Technologies, LLC, Menlo Park, CA (US)

(72) Inventors: Alexander Jobe Fix, Seattle, WA (US); Douglas Robert Lanman, Bellevue, WA (US); Ying Geng, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 8 days.

(21) Appl. No.: 14/963,127

(22) Filed: Dec. 8, 2015

(65) Prior Publication Data

US 2017/0161951 A1    Jun. 8, 2017

(51) Int. Cl.
| | |
|---|---|
| *G06K 9/00* | (2006.01) |
| *G06T 5/00* | (2006.01) |
| *G06T 7/20* | (2017.01) |
| *G06T 19/00* | (2011.01) |
| *G09G 5/00* | (2006.01) |

(52) U.S. Cl.
CPC ............ *G06T 5/00* (2013.01); *G06K 9/00604* (2013.01); *G09G 5/00* (2013.01); *G09G 2320/0693* (2013.01)

(58) Field of Classification Search
CPC . G06K 9/0061; G06T 19/006; G06T 2200/04; G06T 5/00; G06T 7/20; G09G 2320/0693; G09G 5/00
See application file for complete search history.

(56) References Cited

U.S. PATENT DOCUMENTS

| | | | |
|---|---|---|---|
| 5,768,443 A | * | 6/1998 | Michael .................. G06T 5/006 382/151 |
| 5,801,885 A | | 9/1998 | Togino |
| 5,892,570 A | | 4/1999 | Stevens |
| 9,915,824 B2 | | 3/2018 | Schowengerdt et al. |
| 9,939,643 B2 | | 4/2018 | Schowengerdt |

(Continued)

FOREIGN PATENT DOCUMENTS

| | | |
|---|---|---|
| JP | H0764013 A | 3/1995 |
| JP | 3298081 B2 | 7/2002 |

(Continued)

OTHER PUBLICATIONS

Machine translated JP2014-219521; Date of publication: Nov. 20, 2014.

(Continued)

*Primary Examiner* — Sing-Wai Wu
(74) *Attorney, Agent, or Firm* — Fenwick & West LLP

(57) ABSTRACT

A scene presented by a headset is adjusted to correct for distortion from optical errors of an optics block in the headset. To correct for the distortion, the scene is pre-distorted when presented based on previously modeled distortion of the optics block, so distortion from the optics block corrects the pre-distortion. To model the distortion, the headset displays calibration image including features and images of the calibration image are captured from multiple positions. Differences between locations of features in the calibration images and locations of corresponding features in captured images of the calibration image are identified and a distortion correction is determined based on the differences.

20 Claims, 13 Drawing Sheets

(56) References Cited

U.S. PATENT DOCUMENTS

| | | | |
|---|---|---|---|
| 2001/0017687 A1* | 8/2001 | Rodriguez, Jr. | H04N 5/74 353/70 |
| 2006/0210111 A1 | 9/2006 | Cleveland et al. | |
| 2007/0183293 A1 | 8/2007 | Murata et al. | |
| 2008/0062164 A1* | 3/2008 | Bassi | H04N 9/3147 345/214 |
| 2010/0141852 A1 | 6/2010 | Jurik et al. | |
| 2010/0177163 A1* | 7/2010 | Yang | G06T 15/02 348/45 |
| 2011/0075257 A1 | 3/2011 | Hua et al. | |
| 2012/0249797 A1 | 10/2012 | Haddick et al. | |
| 2013/0050070 A1 | 2/2013 | Lewis et al. | |
| 2013/0176533 A1 | 7/2013 | Raffle et al. | |
| 2013/0314793 A1 | 11/2013 | Robbins et al. | |
| 2014/0092139 A1 | 4/2014 | Sullivan et al. | |
| 2014/0153102 A1 | 6/2014 | Chang | |
| 2014/0177063 A1* | 6/2014 | Wang | G02B 5/30 359/630 |
| 2014/0211193 A1 | 7/2014 | Bloom et al. | |
| 2014/0368793 A1 | 12/2014 | Friedman et al. | |
| 2015/0062558 A1 | 3/2015 | Koppal et al. | |
| 2015/0102981 A1 | 4/2015 | Lee et al. | |
| 2015/0181096 A1 | 6/2015 | Kasai et al. | |
| 2015/0212326 A1 | 7/2015 | Kress et al. | |
| 2015/0222883 A1 | 8/2015 | Welch | |
| 2015/0237336 A1 | 8/2015 | Sylvan et al. | |
| 2015/0286070 A1 | 10/2015 | Aikawa | |
| 2015/0288944 A1 | 10/2015 | Nistico et al. | |
| 2015/0312560 A1 | 10/2015 | Deering et al. | |
| 2015/0346495 A1 | 12/2015 | Welch et al. | |
| 2016/0005179 A1 | 1/2016 | Petyushko et al. | |
| 2016/0091720 A1* | 3/2016 | Stafford | G02B 27/0172 345/8 |
| 2016/0103419 A1 | 4/2016 | Callagy et al. | |
| 2016/0219269 A1 | 7/2016 | Tekolste | |
| 2016/0295178 A1 | 10/2016 | Damberg et al. | |
| 2016/0371886 A1 | 12/2016 | Thompson et al. | |
| 2017/0213388 A1 | 7/2017 | Margolis et al. | |
| 2017/0299869 A1 | 10/2017 | Urey et al. | |
| 2018/0114298 A1 | 4/2018 | Malaika et al. | |
| 2018/0133593 A1 | 5/2018 | Wilson | |

FOREIGN PATENT DOCUMENTS

| | | |
|---|---|---|
| JP | 2014-219621 A | 11/2014 |
| KR | 10-2013-0011692 A | 1/2013 |
| KR | 10-2014-0144510 A | 12/2014 |
| WO | WO 2013/140697 | 3/2012 |
| WO | WO 2015/184412 A1 | 12/2015 |

OTHER PUBLICATIONS

PCT International Search Report and Written Opinion, PCT Application No. PCT/US2017/012346, dated Mar. 30, 2017, 13 pages.

PCT International Search Report and Written Opinion, PCT Application No. PCT/US2016/059938, dated Dec. 20, 2016, 12 pages.

PCT International Search Report and Written Opinion, PCT Application No. PCT/US2016/017397, dated Aug. 16, 2016, 21 pages.

U.S. Appl. No. 15/407,701, filed Jan. 17, 2017, Inventors Nicholas Daniel Trail et al.

U.S. Appl. No. 14/963,126, filed Dec. 8, 2015, Inventors Douglas Robert Lanman et al.

U.S. Appl. No. 15/366,412, filed Dec. 1, 2016, Inventor Nicholas Daniel Trail.

U.S. Appl. No. 14/963,109, filed Dec. 8, 2015, Inventors Douglas Robert Lanman et al.

European Extended Search Report, European Application No. 16161315.3, dated Aug. 2, 2016, 10 pages.

Robinett, W., "Computational Model for the Stereoscopic Optics of a Head-Mounted Display," Proceedings of SPIE Stereoscopic Displays and Applications II, Jan. 1991, pp. 140-160, vol. 1457.

State, A. et al., "Dynamic Virtual Convergence for Video See-Through Head-Mounted Displays: Maintaining Maximum Stereo Overlap Throughout a Close-Range Work Space," IEEE and ACM International Symposium on New Augmented Reality, Oct. 29-30, 2001, pp. 137-146.

Japan Patent Office, Office Action, Japanese Patent Application No. 2018-528282, dated Dec. 11, 2018, six pages.

United States Office Action, U.S. Appl. No. 15/456,388, dated Feb. 20, 2019, 29 pages.

\* cited by examiner (Real World)

(3D Display)

(Frame n)

(Frame n+1)

(Frame n)

(Frame n+1)

AUTOFOCUS VIRTUAL REALITY HEADSET

BACKGROUND

The present disclosure generally relates to enhancing images from electronic displays, and specifically to varying the focal length of optics to enhance the images.

Virtual reality (VR) headsets can be used to simulate virtual environments. For example, stereoscopic images are displayed on an electronic display inside the headset to simulate the illusion of depth and head tracking sensors estimate what portion of the virtual environment is being viewed by the user. However, conventional VR headsets are often unable to compensate for vergence and accommodation conflicts when rendering content, which may cause visual fatigue and nausea in users.

Further, lenses and other optical components are subject to various types of optical errors. For example, field curvature commonly associated with convex lenses tends to bend light rays near the edges of a convex lens more sharply inward relative to light rays near the center of the convex lens. The resulting distortion from the convex lens makes a virtual scene viewed through the convex lens appear as if it is viewed underwater or through a fisheye lens, which may detract from the illusion of the virtual scene created by a virtual reality system.

SUMMARY

Display of a scene of content presented by a virtual reality (VR) headset, which may include a headset presenting augmented reality (AR) content, is modified to mitigate distortion from optical errors (e.g., field distortion, field curvature, etc.) caused by an optics block included in the headset that directs image light from an electronic display element presenting the scene to an eye of a user. Modifying display of the scene compensates or corrects distortion in the scene resulting from these optical errors. Distortion can be caused for a number of reasons. For example, as a user looks at different objects in the virtual scene, the location of the pupil of the user's eye relative to the optics block changes (e.g., distance of the pupil from the optics block, the viewing angle through the optics block, the distance from the optical axis of the optics block, etc.). Different distances between the eye and the optics block cause focusing of light from the electronic display element in different locations within the eye and different viewing angles or distances between the pupil and the optics block's optical axis may be affected by field curvature that is perceived as distortion by the user. In another example, a varifocal element dynamically adjusts the focal length of the optics block included in the VR headset based on a location in the virtual scene where the user is looking. Thus, an adjustment or alteration is made to the virtual scene when the focal length of the optics block is adjusted to correct for distortion caused by optical errors of the optics block at that focal length. To correct for the distortion, the virtual scene may be rendered with pre-distortion based on previously modeled distortion caused by the optics block. Rendering the virtual scene with pre-distortion causes distortion caused by the optics block to cancel or to correct the pre-distortion so the virtual scene appears undistorted when viewed from an exit pupil of the virtual reality headset.

To model distortion caused by the optics block, a calibration image is displayed by the virtual reality headset and a camera captures multiple images of the displayed calibration image from different positions relative to the exit pupil. A position relative to the exit pupil may account for a distance between the camera and the exit pupil. Capturing images from multiple positions relative to the exit pupil enables the calibration system to measure optical properties of the optics block (e.g., the focal length(s), how the focal length(s) vary as a function of angle, higher-order aberrations of the optics block, etc.) by emulating a wavefront sensor providing better correction of distortion caused by the optics block, as the distortion is generally non-linear and changes based on a state of the optics block. In various embodiments, the multiple positions from which images are captured correspond to potential locations of a user's eye or viewing angles and, for a varifocal system, potential locations of the user's eye or viewing angles for each state (e.g., lens position, lens shape, eye position etc.) of the optics block. The calibration image includes a pattern, such as a checkerboard pattern or an array of points, and features of the calibration image, such as the actual, ideal, or theoretical location of features (e.g., the checkerboard squares, or the points), are compared to the observed location of those features captured (or observed) by the camera. Displacement between the observed locations of the features and the actual locations of the features is directly proportional to the gradient of the wavefront of light from the optics block.

Based on a difference between the observed locations of the features of the calibration image and the actual locations of the features of the calibration image, a model of the wavefront of light from for various states of the optics block or pupil locations relative to the optics block is determined and a corresponding rendering adjustment is determined. Based on the model of the wavefront for a current state of the optics block or pupil location relative to the optics block, the VR headset identifies a rendering adjustment corresponding to the current state of the optics block and applies the identified rendering adjustment to the virtual scene. Hence, the rendering adjustment is modified or changed as the pupil location or the state of the optics block changes (e.g., as a varifocal element changes the position or the shape of the optics block) to correct for optical errors caused by different pupil locations relative to the optics block states of the optics block.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
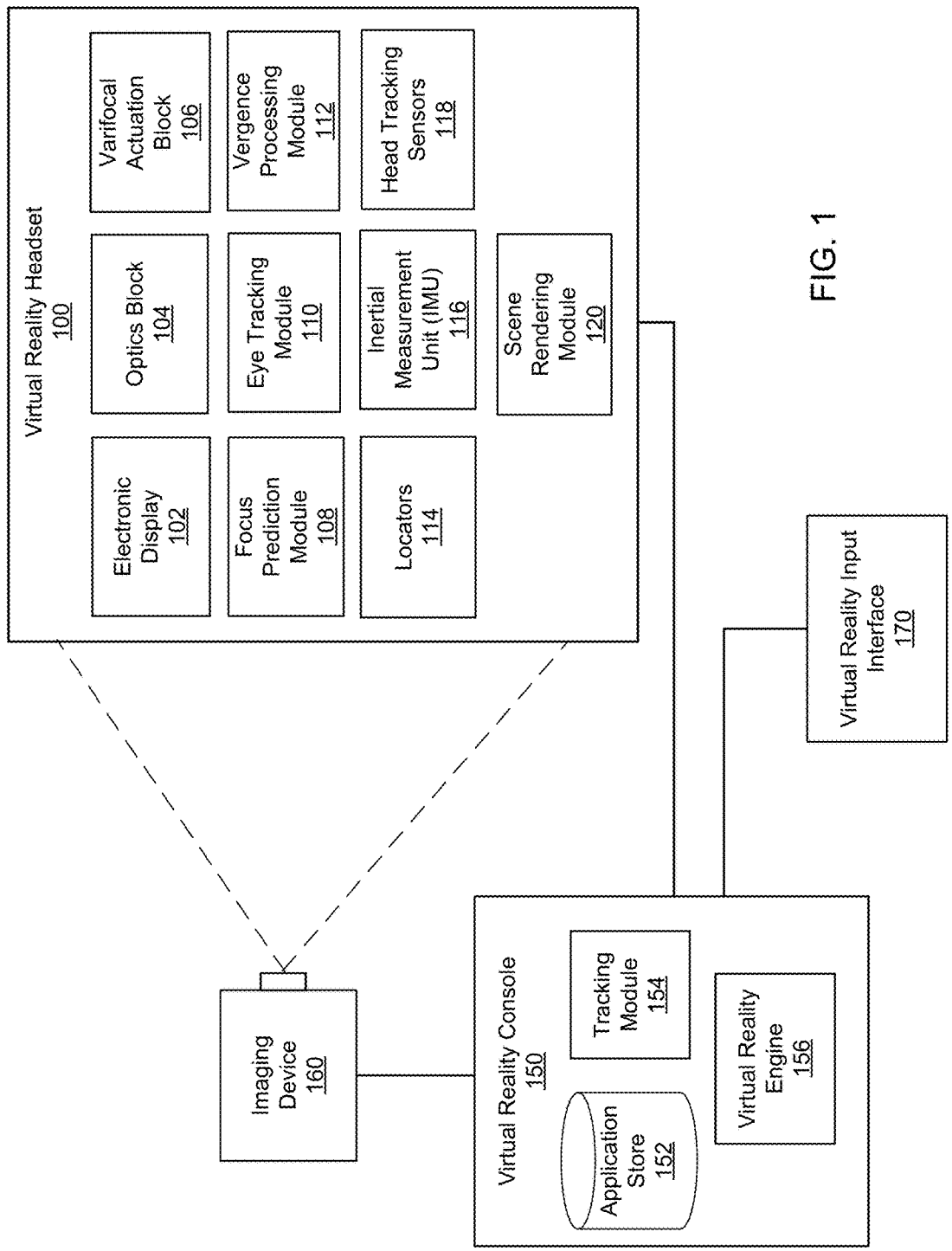
FIG. 1 shows an example virtual reality system, in accordance with at least one embodiment.

FIG. 1 is virtual reality (VR) system environment in which a VR console 150 operates. In this example, the VR system environment includes VR headset 100, imaging device 160, and VR input interface 170, which are each coupled to VR console 150. While FIG. 1 shows a single VR headset 100, a single imaging device 160, and a single VR input interface 170, in other embodiments, any number of these components may be included in the system. For example, there may be multiple VR headsets 100 each having an associated VR input interface 170 and being monitored by one or more imaging devices 160, with each VR headset 100, VR input interface 170, and imaging devices 160 communicating with the VR console 150. In alternative configurations, different and/or additional components may also be included in the VR system environment.

VR headset 100 is a Head-Mounted Display (HMD) that presents content to a user. Example content includes images, video, audio, or some combination thereof. Audio content may be presented via a separate device (e.g., speakers and/or headphones) external to VR headset 100 that receives audio information from VR headset 100, VR console 150, or both. VR headset 100 includes electronic display 102, optics block 104, varifocal actuation block 106, focus prediction module 108, eye tracking module 110, vergence processing module 112, one or more locators 114, internal measurement unit (IMU) 116, head tracking sensors 118, and scene rendering module 120.

Optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Optics block 104 may be designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to electronic display 102 for display is pre-distorted, and optics block 104 corrects the distortion when it receives image light from electronic display 102 generated based on the content.

Varifocal actuation block 106 includes a varifocal element that causes optics block 104 to vary the focal length (or optical power) of VR headset 100 keep a user's eyes in a zone of comfort as vergence and accommodation change. In one embodiment, varifocal actuation block 106 physically changes the distance between electronic display 102 and optical block 104 by moving electronic display 102 or optical block 104 (or both). Alternatively, varifocal actuation block 106 changes the focal length of optics block 104 by adjusting one or more properties of one or more lenses. Example properties of a lens adjusted by the varifocal actuation block include: an optical path length, an index of refraction of a lens medium, a shape of a lens, and so forth. For example, varifocal actuation block 106 changes the focal length of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of VR headset 100. Thus, varifocal actuation block 106 may include actuators or motors that move electronic display 102 and/or optical block 104 on a track to change the distance between them or may include actuators and other components or mechanisms for changing the properties of one or more lenses included in optics block 104. Varifocal actuation block 106 may be separate from or integrated into optics block 104 in various embodiments.

Each state of optics block 104 corresponds to a focal length of VR headset 110 or to a combination of the focal length and eye position relative to optics block 104 (as discussed further below). In operation, optics block 104 may move in a range of ~5 mm with a positional accuracy of ~5 μm for a granularity of around 1000 focal lengths, corresponding to 1000 states of optics block 104. Any number of states could be provided; however, a limited number of states accommodate the sensitivity of the human eye, allowing some embodiments to include fewer focal lengths. For example, a first state corresponds to a focal length of a theoretical infinity meters (0 diopter), a second state corresponds to a focal length of 2.0 meters (0.5 diopter), a third state corresponds to a focal length of 1.0 meters (1 diopter), a fourth state corresponds to a focal length of 0.5 meters (1 diopter), a fifth state corresponds to a focal length of 0.333 meters (3 diopter), and a sixth state corresponds to a focal length of 0.250 meters (4 diopter). Varifocal actuation block 106, thus, sets and changes the state of optics block 104 to achieve a desired focal length.

Focus prediction module 108 is an encoder including logic that tracks the state of optics block 104 to predict to one or more future states or locations of optics block 104. For example, focus prediction module 108 accumulates historical information corresponding to previous states of optics block 104 and predicts a future state of optics block 104 based on the previous states. Because rendering of a virtual scene by VR headset 100 is adjusted based on the state of optics block 104, the predicted state allows scene rendering module 120, further described below, to determine an adjustment to apply to the virtual scene for a particular frame. Accordingly, focus prediction module 108 communicates information describing a predicted state of optics block 104 for a frame to scene rendering module 120. Adjustments for the different states of optics block 104 performed by scene rendering module 120 are further described below.

Eye tracking module 110 tracks an eye position and eye movement of a user of VR headset 100. A camera or other optical sensor inside VR headset 100 captures image information of a user's eyes, and eye tracking module 110 uses the captured information to determine interpupillary distance, interocular distance, a three-dimensional (3D) position of each eye relative to VR headset 100 (e.g., for distortion adjustment purposes), including a magnitude of torsion and rotation (i.e., roll, pitch, and yaw) and gaze directions for each eye. In one example, infrared light is emitted within VR headset 100 and reflected from each eye. The reflected light is received or detected by the camera and analyzed to extract eye rotation from changes in the infrared light reflected by each eye. Many methods for tracking the eyes of a user can be used by eye tracking module 110. Accordingly, eye tracking module 110 may track up to six degrees of freedom of each eye (i.e., 3D position, roll, pitch, and yaw) and at least a subset of the tracked quantities may be combined from two eyes of a user to estimate a 3D gaze position. For example, eye tracking module 110 integrates information from past measurements, measurements identifying a position of a user's head, and 3D information describing a scene presented by electronic display element 102. Thus, information for the position and orientation of the user's eyes is used to determine a 3D location or position in a virtual scene presented by VR headset 100 where the user is looking.

Further, the relative 3D position between a pupil and optics block 104 changes as the eye moves to look in different directions. As the relative 3D position between the pupil and the optics block 104 changes, the way that light goes through optics block 104 and focuses changes, and the resulting change in distortion and image quality as perceived by the user is referred to as "pupil swim". Accordingly, measuring distortion in different eye positions and pupil distances relative to optics block 104 and generating distortion corrections for different positions and distances allows mitigation of distortion change caused by "pupil swim" by tracking the 3D position of a user's eyes and applying a distortion correction corresponding to the 3D position of each of the user's eye at a given point in time. Thus, the 3D position of each of a user's eyes allows mitigation of distortion caused by changes in the distance between the pupil of the eye and optics block 104.

Vergence processing module 112 calculates a vergence depth of a user's gaze based on an estimated intersection of the gaze lines determined by eye tracking module 110. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, vergence processing module 112 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as a plane of focus, for rendering adjustments to the virtual scene. In some embodiments, rather than provide accommodation for the eye at a determined vergence depth, accommodation may be directly determined by a wavefront sensor, such as a Shack-Hartmann wavefront sensor or an autorefractor; hence, a state of optics block 104 may be a function of the vergence or accommodation depth and the 3D position of each eye, so optics block 104 brings objects in a scene presented by electronic display element 102 into focus for a user viewing the scene. Further, vergence and accommodation information may be combined to focus optics block 104 and to render synthetic depth of field blur.

Locators 114 are objects located in specific positions on VR headset 100 relative to one another and relative to a specific reference point on VR headset 100. Locator 114 may be a light emitting diode (LED), a corner cube reflector, a reflective marker, a type of light source that contrasts with an environment in which VR headset 100 operates, or some combination thereof. Active locators 114 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 114 can be located beneath an outer surface of VR headset 100, which is transparent to the wavelengths of light emitted or reflected by locators 114 or is thin enough not to substantially attenuate the wavelengths of light emitted or reflected by locators 114. Further, the outer surface or other portions of VR headset 100 can be opaque in the visible band of wavelengths of light. Thus, locators 114 may emit light in the IR band while under an outer surface of VR headset 100 that is transparent in the IR band but opaque in the visible band.

IMU 116 is an electronic device that generates fast calibration data based on measurement signals received from one or more of head tracking sensors 118, which generate one or more measurement signals in response to motion of VR headset 100. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

Based on the measurement signals from head tracking sensors 118, IMU 116 generates fast calibration data indicating an estimated position of VR headset 100 relative to an initial position of VR headset 100. For example, head tracking sensors 118 include multiple accelerometers to measure translational motion (forward/back, up/down, left/right) and multiple gyroscopes to measure rotational motion (e.g., pitch, yaw, and roll). IMU 116 can, for example, rapidly sample the measurement signals and calculate the estimated position of VR headset 100 from the sampled data. For example, IMU 116 integrates measurement signals received from the accelerometers over time to estimate a velocity vector and integrates the velocity vector over time to determine an estimated position of a reference point on VR headset 100. The reference point is a point that may be used to describe the position of VR headset 100. While the reference point may generally be defined as a point in space, in various embodiments, reference point is defined as a point within VR headset 100 (e.g., a center of the IMU 130). Alternatively, IMU 116 provides the sampled measurement signals to VR console 150, which determines the fast calibration data.

IMU 116 can additionally receive one or more calibration parameters from VR console 150. As further discussed below, the one or more calibration parameters are used to maintain tracking of VR headset 100. Based on a received calibration parameter, IMU 116 may adjust one or more IMU parameters (e.g., sample rate). In some embodiments, certain calibration parameters cause IMU 116 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 120 receives content for the virtual scene from VR engine 156 and provides the content for display on electronic display 102. Additionally, scene render module 120 can adjust the content based on information from focus prediction module 108, vergence processing module 112, IMU 116, and head tracking sensors 118. For example, upon receiving the content from VR engine 156, scene render module 120 adjusts the content based on the predicted state of optics block 104 received from focus prediction module 108 by adding a correction or predistortion into rendering of the virtual scene to compensate or correct for the distortion caused by the predicted state of optics block 104. Scene render module 120 may also add depth of field blur based on the user's gaze, vergence depth (or accommodation depth) received from vergence processing module 112, or measured properties of the user's eye (e.g., 3D position of the eye, etc.). Additionally, scene render module 120 determines a portion of the content to be displayed on electronic display 102 based on one or more of tracking module 154, head tracking sensors 118, or IMU 116, as described further below.

Imaging device 160 generates slow calibration data in accordance with calibration parameters received from VR console 150. Slow calibration data includes one or more images showing observed positions of locators 114 that are detectable by imaging device 160. Imaging device 160 may include one or more cameras, one or more video cameras, other devices capable of capturing images including one or more locators 114, or some combination thereof. Additionally, imaging device 160 may include one or more filters (e.g., for increasing signal to noise ratio). Imaging device 160 is configured to detect light emitted or reflected from locators 114 in a field of view of imaging device 160. In embodiments where locators 114 include passive elements (e.g., a retroreflector), imaging device 160 may include a light source that illuminates some or all of locators 114, which retro-reflect the light towards the light source in imaging device 160. Slow calibration data is communicated from imaging device 160 to VR console 150, and imaging device 160 receives one or more calibration parameters from VR console 150 to adjust one or more imaging parameters (e.g., focal length, focus, frame rate, ISO, sensor temperature, shutter speed, aperture, etc.).

VR input interface 170 is a device that allows a user to send action requests to VR console 150. An action request is a request to perform a particular action. For example, an action request may be to start or end an application or to perform a particular action within the application. VR input interface 170 may include one or more input devices. Example input devices include a keyboard, a mouse, a game controller, or any other suitable device for receiving action requests and communicating the received action requests to VR console 150. An action request received by VR input interface 170 is communicated to VR console 150, which performs an action corresponding to the action request. In some embodiments, VR input interface 170 may provide haptic feedback to the user in accordance with instructions received from VR console 150. For example, haptic feedback is provided by the VR input interface 170 when an action request is received, or VR console 150 communicates instructions to VR input interface 170 causing VR input interface 170 to generate haptic feedback when VR console 150 performs an action.

VR console 150 provides content to VR headset 100 for presentation to the user in accordance with information received from imaging device 160, VR headset 100, or VR input interface 170. In the example shown in FIG. 1, VR console 150 includes application store 152, tracking module 154, and virtual reality (VR) engine 156. Some embodiments of VR console 150 have different or additional modules than those described in conjunction with FIG. 1. Similarly, the functions further described below may be distributed among components of VR console 150 in a different manner than is described here.

Application store 152 stores one or more applications for execution by VR console 150. An application is a group of instructions, that when executed by a processor, generates content for presentation to the user. Content generated by an application may be in response to inputs received from the user via movement of VR headset 100 or VR interface device 170. Examples of applications include gaming applications, conferencing applications, video playback application, or other suitable applications.

Tracking module 154 calibrates the VR system using one or more calibration parameters and may adjust one or more calibration parameters to reduce error in determining position of VR headset 100. For example, tracking module 154 adjusts the focus of imaging device 160 to obtain a more accurate position for observed locators 114 on VR headset 100. Moreover, calibration performed by tracking module 154 also accounts for information received from IMU 116. Additionally, if tracking of VR headset 100 is lost (e.g., imaging device 160 loses line of sight of at least a threshold number of locators 114), tracking module 154 re-calibrates some or all of the VR system components.

Additionally, tracking module 154 tracks the movement of VR headset 100 using slow calibration information from imaging device 160 and determines positions of a reference point on VR headset 100 using observed locators from the slow calibration information and a model of VR headset 100. Tracking module 154 also determines positions of the reference point on VR headset 100 using position information from the fast calibration information from IMU 116 on VR headset 100. Additionally, tracking module 154 may use portions of the fast calibration information, the slow calibration information, or some combination thereof, to predict a future location of VR headset 100, which is provided to VR engine 156.

VR engine 156 executes applications within the VR system and receives position information, acceleration information, velocity information, predicted future positions, or some combination thereof for VR headset 100 from tracking module 154. Based on the received information, VR engine 156 determines content to provide to VR headset 100 for presentation to the user, such as a virtual scene. For example, if the received information indicates that the user has looked to the left, VR engine 156 generates content for VR headset 100 that mirrors or tracks the user's movement in a virtual environment. Additionally, VR engine 156 performs an action within an application executing on VR console 150 in response to an action request received from the VR input interface 170 and provides feedback to the user that the action was performed. The provided feedback may be visual or audible feedback via VR headset 100 or haptic feedback via VR input interface 170.

Figure 2:
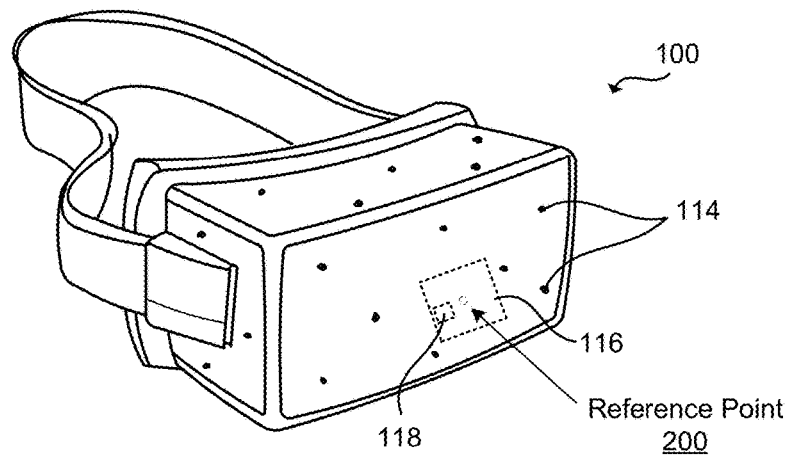
FIG. 2 shows a diagram of a virtual reality headset, in accordance with at least one embodiment.

FIG. 2 is a diagram of VR headset 100, in accordance with at least one embodiment. In this example, VR headset 100 includes a front rigid body and a band that goes around a user's head. The front rigid body includes one or more electronic display elements corresponding to electronic display 102, IMU 116, head tracking sensors 118, and locators 114. In this example, head tracking sensors 118 are located within IMU 116.

Figure 3:
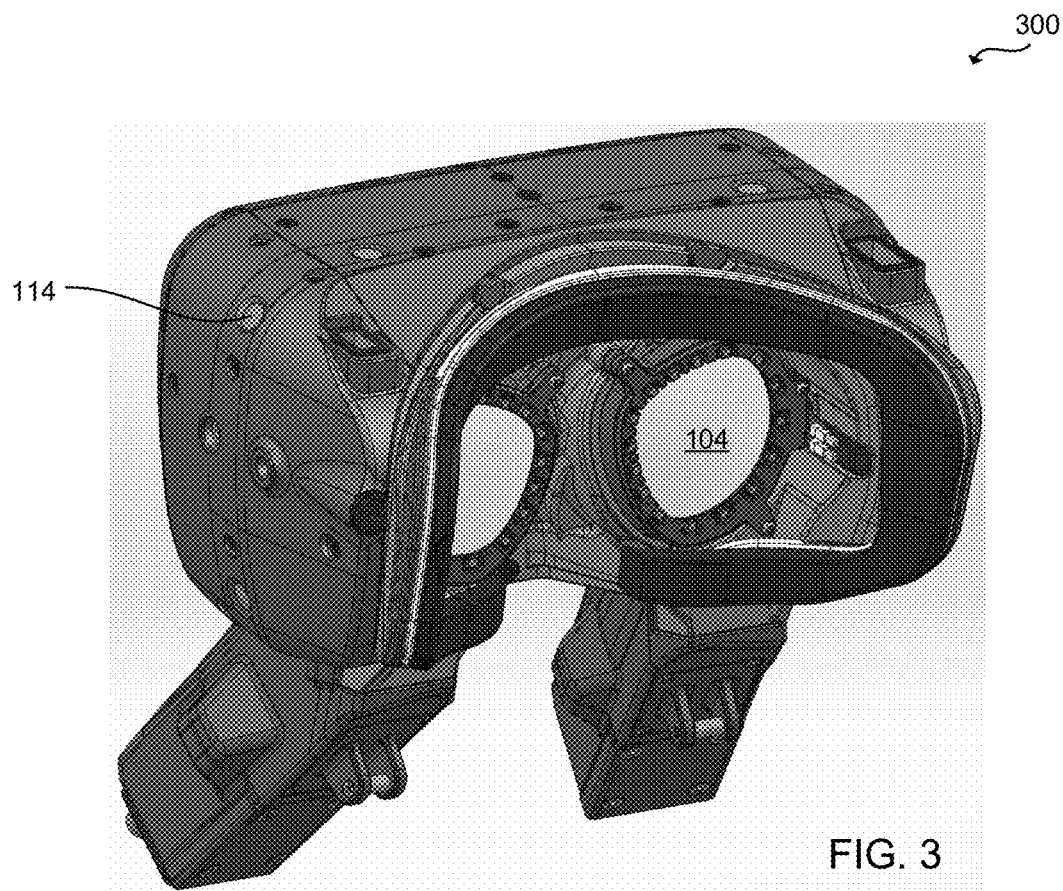
FIG. 3 shows a virtual reality headset, in accordance with at least one embodiment.

Locators 114 are located in fixed positions on the front rigid body relative to one another and relative to reference point 200. In this example, reference point 200 is located at the center of IMU 116. Each of locators 114 emits light that is detectable by imaging device 160. Locators 114, or portions of locators 114, are located on a front side, a top side, a bottom side, a right side, and a left side of the front rigid body, as shown FIG. 2. FIG. 3 shows a rear perspective view looking into VR headset 300 where an outer lens of optics block 104 is visible. In this example, locators 114 are visible and provided, as discussed above, on VR headset 300 for detection by imaging device 160.

Adjustable Focus Method

Figure 4:
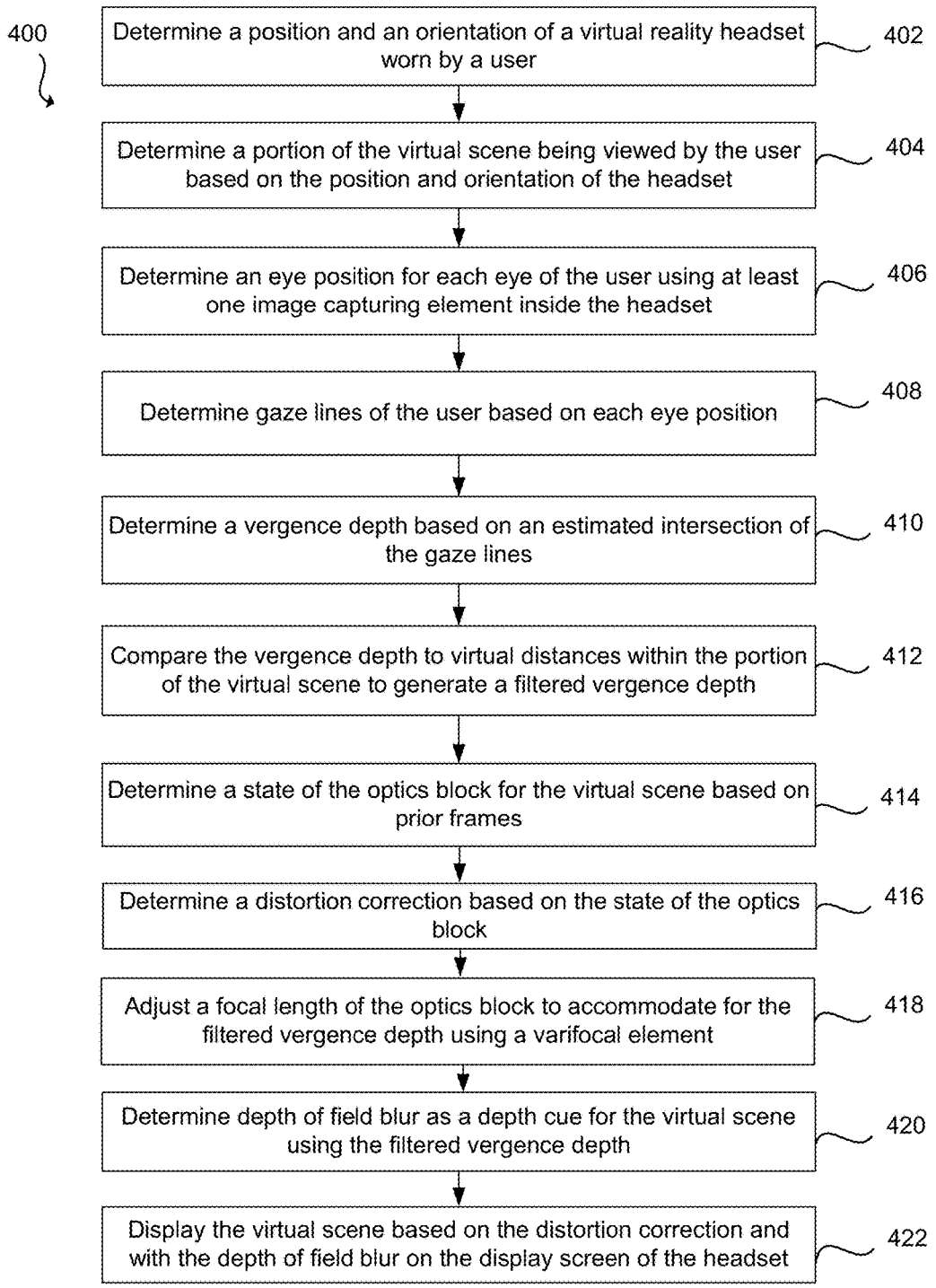
FIG. 4 shows an example process for mitigating vergence-accommodation conflict by adjusting the focal length of an optics block of a virtual reality headset, in accordance with at least one embodiment.

FIG. 4 shows an embodiment of a process 400 for mitigating vergence-accommodation conflict by adjusting the focal length of optics block 104 of virtual reality (VR) headset 100. As discussed above, a varifocal system may dynamically vary its focus to bring images presented to a user wearing VR headset 100 into focus, which keeps the user's eyes in a zone of comfort as vergence and accommodation change. Additionally, eye tracking in combination with the variable focus of the varifocal system allows blurring to be introduced as depth cues in images presented by VR headset 100.

Accordingly, in the embodiment shown by FIG. 4, a position, an orientation, and/or a movement of VR headset 100 are determined 402 by a combination of locators 114, IMU 116, head tracking sensors 118, imagining device 160, and tracking module 154, as described above in conjunction with FIG. 1. Portions of a virtual scene presented by VR headset 100 are mapped to various positions and orientations of VR headset 100. Thus, a portion of the virtual scene currently viewed by a user is determined 404 based on the position, orientation, and movement of VR headset 100. After determining 404 the portion of the virtual scene being viewed by the user, the VR system may then determine a location or an object within the determined portion at which the user is looking to adjust focus for that location or object accordingly.

Figure 5:
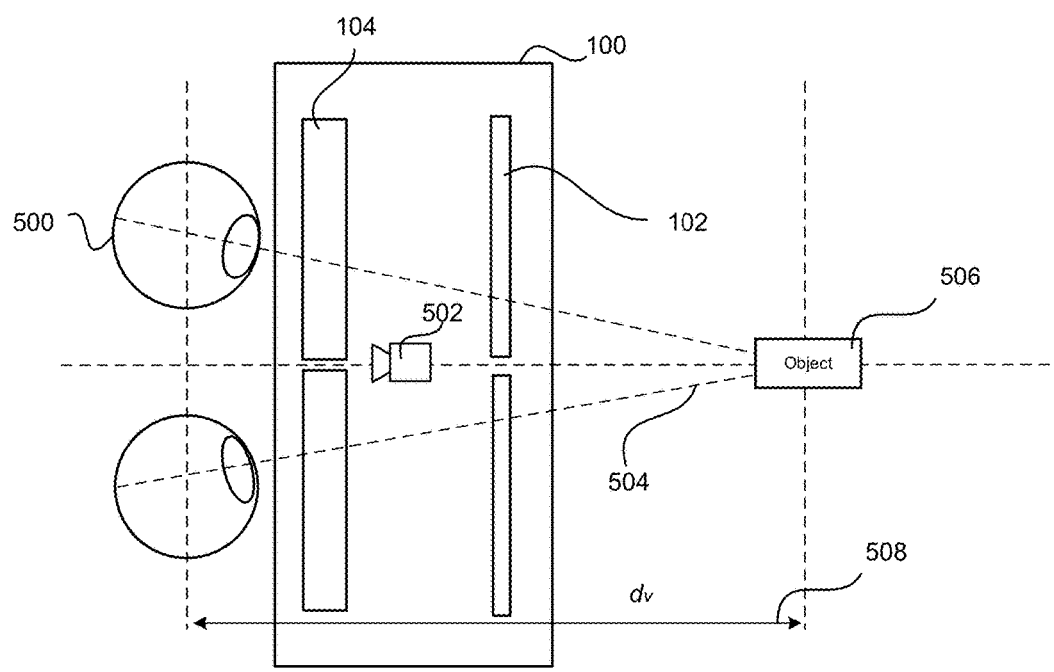
FIG. 5 shows a cross section of a virtual reality headset including a camera for tracking eye position, in accordance with at least one embodiment.

To determine the location or object within the determined portion of the virtual scene at which the user is looking, VR headset 100 tracks the location of the user's eyes. Thus, VR headset 100 determines 406 an eye position for each eye of the user. For example, VR headset 100 tracks at least a subset of the 3D position, roll, pitch, and yaw of each eye and uses these quantities to estimate a 3D gaze position of each eye. Further, information from past eye positions, information describing a position of the user's head, and information describing a scene presented to the user may also be used to estimate the 3D gaze position of an eye in various embodiments. For example, FIG. 5 shows a cross section of an embodiment of VR headset 100 that includes camera 502 for tracking the position of each eye 500. In this example, camera 502 captures images of the user's eyes and eye tracking module 110 determines an output for each eye 500 and gaze lines 504 corresponding a location where the user is looking based on the captured images.

Referring to FIGS. 4 and 5, vergence depth ($d_v$) 508 for the user is determined 410 based on an estimated intersection of gaze lines 504. As shown in FIG. 5, gaze lines 504 converge or intersect at $d_v$ 508, where object 506 is located. Because virtual distances within the virtual scene are known to VR system, the vergence depth 508 can be filtered or verified to determine a more accurate vergence depth for the virtual scene. For example, vergence depth 508 is an approximation of the intersection of gaze lines 504, which are themselves an approximation based on the position of a user's eyes 500. Gaze lines 504 do not always appear to accurately intersect. Thus, virtual distances within the virtual scene are compared 412 to the vergence depth for the portion of the virtual scene to generate a filtered vergence depth.

Figure 6:
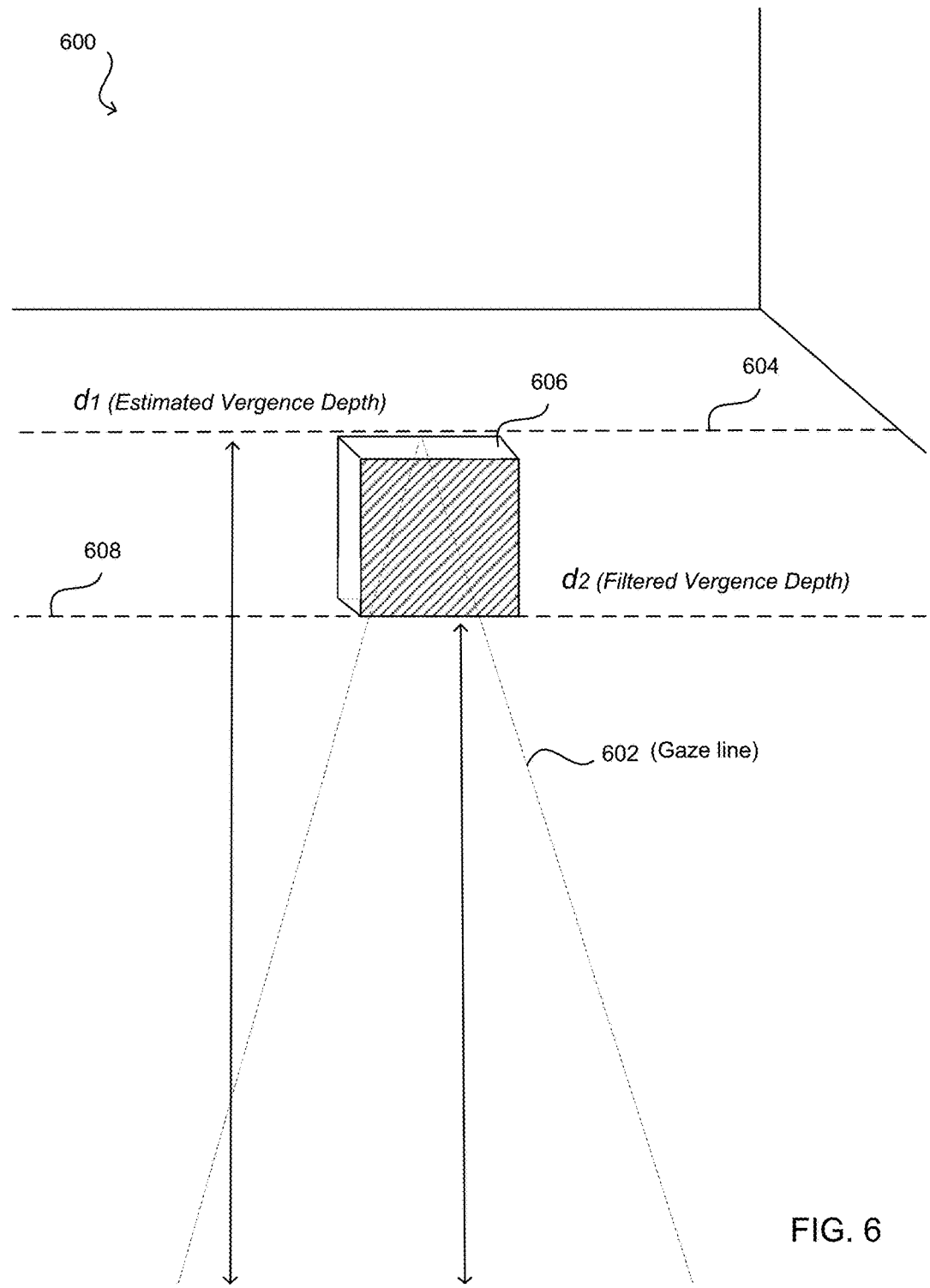
FIG. 6 shows an example process for filtering a vergence depth based on scene geometry, in accordance with at least one embodiment.

FIG. 6 shows an example process for filtering a vergence depth based on scene geometry. In the example of FIG. 6, object 606 is shown on a floor of virtual scene 600 and is the only object in virtual scene 600. Additionally, the geometry for virtual scene 600 is known. For example, to provide a virtual environment enabling a user to interact with that environment as if the user were actually in the virtual environment, the dimensions of the environment corresponding to its geometry are accurately known to VR system. Thus, for a particular frame of virtual scene 600, the distance between the user and the wall, the user and object 606, and object 606 and the wall are known values. These known values allow the accuracy of the determined vergence depth.

In the example of FIG. 6, gaze lines 602 are initially verged at vergence depth $d_1$ (line 604), which corresponds to the estimated vergence depth determined by vergence processing module 112. Vergence processing module 112 receives data for virtual scene 600 that including scene geometry data describing distances between objects in virtual scene 600 from scene render module 120 to verify the accuracy of the estimated vergence depth. The scene geometry data, in this example, indicates that virtual scene 600 includes object 606 at distance $d_2$ (line 608) from the user. Vergence processing module 112 compares distance $d_1$ to $d_2$ to determine if they are equal. In the example of FIG. 6, the distances $d_1$ and $d_2$ are unequal, but the difference is less than a threshold distance, indicating the estimated vergence depth ($d_1$) was slightly inaccurate and that the vergence depth is more accurately $d_2$. Because, vergence processing module 112 obtains information indicating there are no other objects in virtual scene 600, vergence processing module 112 and filters or adjusts the estimated vergence depth $d_1$ to filtered vergence depth $d_2$.

Determining a more accurate vergence depth enables the virtual scene to more accurately determine a user's plane of focus, allowing scene rendering module 120 to add depth of field blur to proper depths in the virtual scene or otherwise modify to virtual scene to appear more realistic. Further, if virtual scene 600 in FIG. 6 included multiple objects, the vergence processing module 112 compares the estimated vergence depth to distances associated with at least a subset of the objects. In one example, the minimum difference between distance to an object and the estimated vergence depth is determined to be the filtered vergence depth; however, other methods of identifying an object that specifies the filtered vergence depth may be used in various embodiments.

Returning to FIG. 4, a state of optics block 104 is determined 414 for a frame of the virtual scene based on states of optics block 140 during presentation of previous frames of the virtual scene. For example, focus prediction module 108 tracks the state of optics block 104 for various frames of the virtual scene to predict to a future state of optics block 104 for subsequent frames of the virtual scene. The predicted state of optics block 104 (e.g., a predicted location of optics block 104) allows the scene rendering module 114 to determine an adjustment to apply to a frame of the virtual scene so distortion caused by the predicted state of optics block 104 corrects or cancels the applied adjustment rather than distorting the frame. Thus, based on the state of optics block 104, a distortion correction is determined 416 for application to a frame of the virtual scene to correct optical error introduced by the state of optics block 104. Determining distortion corrections for states of optics block 104 is further discussed below.

Figure 7A:
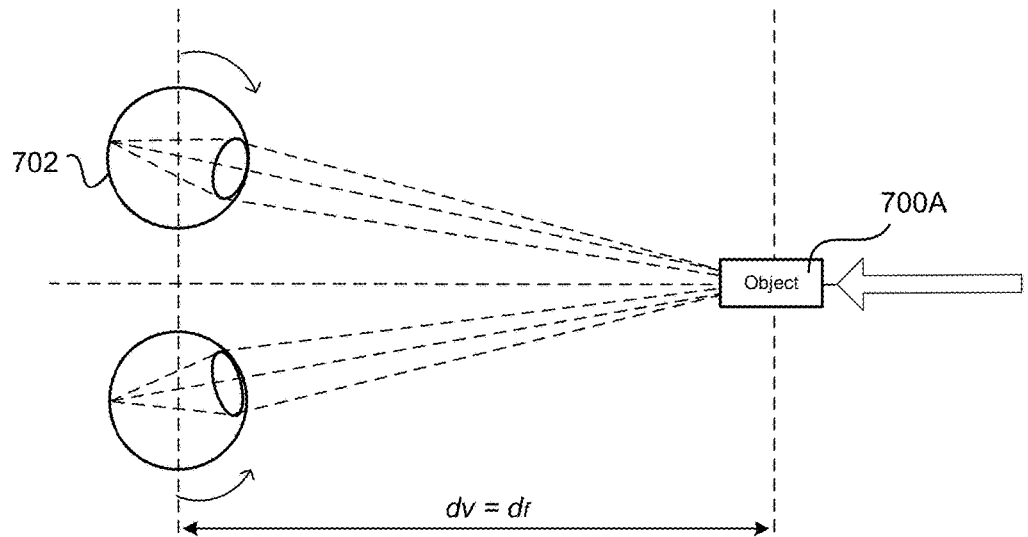
FIG. 7A shows the relationship between vergence and eye focal length in the real world.

FIG. 7A shows an example of how the human eye experiences vergence and accommodation in the real world. Vergence is the simultaneous movement or rotation of both eyes in opposite directions to obtain or maintain single binocular vision and is connected to accommodation of the eye. Under normal conditions, changing the focus of the eyes to look at an object at a different distance automatically causes vergence and accommodation. In the example of FIG. 7A, the user is looking at real object 700A (i.e., the user's eyes are verged on real object 700A and gaze lines from the user's eyes intersect at real object 700A.). As real object 700A is moved closer to the user, as indicated by the arrow in FIG. 7A, each eye 702 rotates inward to stay verged on real object 700A. As real object 700A gets closer, eye 702 must "accommodate" for the closer distance by reducing the power or focal length of eye 702 by changing its shape. Thus, under normal conditions in the real world, the vergence depth ($d_v$) equals the focal length ($d_f$).

Figure 7B:
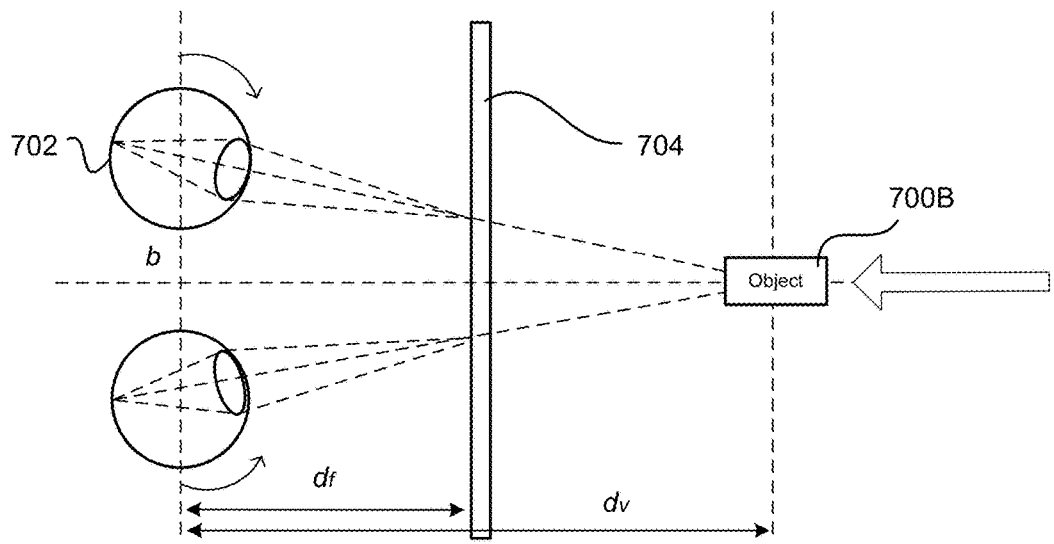
FIG. 7B shows the conflict between vergence and eye focal length in a three-dimensional display.

However, FIG. 7B shows an example conflict between vergence and accommodation that can occur with some three-dimensional displays. In this example, a user is looking at virtual object 700B displayed on 3D electronic screen 704; however, the user's eyes are verged on and gaze lines from the user's eyes intersect at virtual object 700B, which is a greater distance from the user's eyes than 3D electronic screen 704. As virtual object 700B is rendered on 3D electronic display 704 to appear closer to the user, each eye 702 again rotates inward to stay verged on virtual object 700B, but the power or focal length of each eye is not reduced; hence, the user's eyes do not accommodate as in FIG. 7A. Thus, instead of reducing power or focal length to accommodate for the closer vergence depth, eye 702 maintains accommodation at a distance associated with 3D electronic display 704. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators. Changes in vergence for a 3D electronic screen may be accommodated by a VR headset dynamically adjusting the power of an optics block based on the vergence depth (or predicted vergence depth).

Figure 8A:
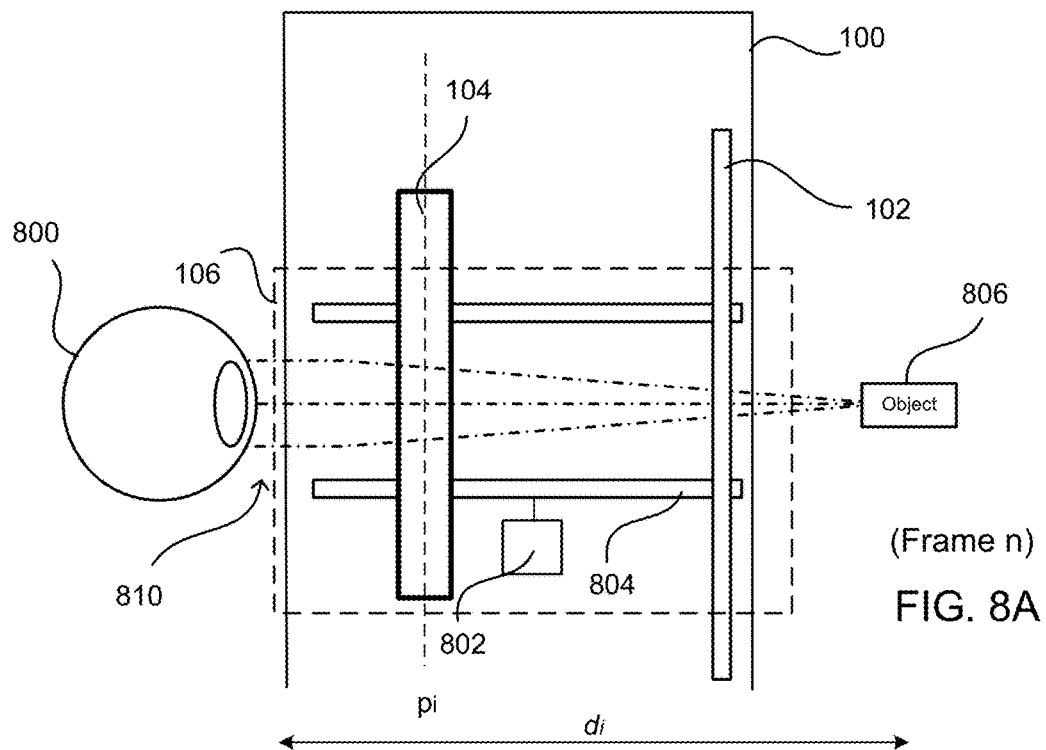
FIGS. 8A and 8B show an example process for adjusting the focal length of an optics block of a virtual reality headset by varying the distance between a display screen and the optics block using a varifocal element, in accordance with at least one embodiment.
Figure 8B:
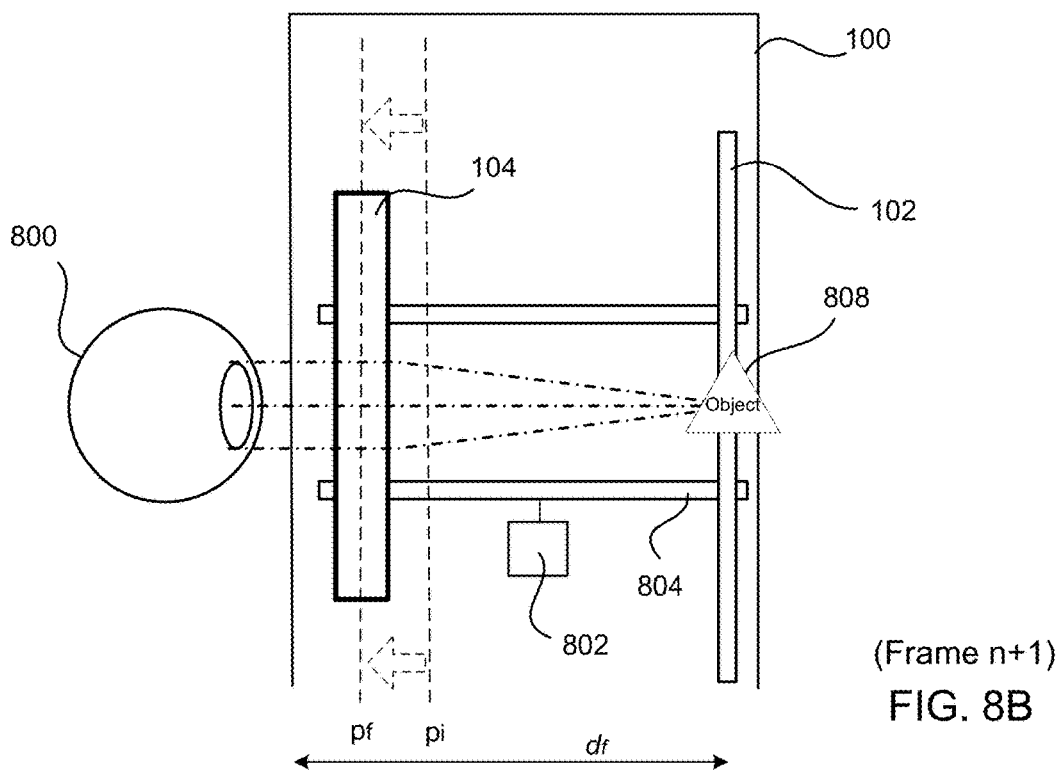

Accordingly, referring again to FIG. 4, the focal length (or power) of optics block 104 is adjusted 418 for the presented frame of the virtual scene to provide accommodation for the generated filtered vergence depth. FIGS. 8A and 8B show an example process for adjusting the focal length of optics block 104 by varying the distance between electronic display 102 and optics block 104 using varifocal element 802. In the example of FIGS. 8A and 8B, varifocal actuation block 106 includes varifocal element 802, such as an actuator or motor and track 804, but may also include other components enabling optics block 104, electronic display 102, or both to move along track 804 to dynamically adjust the optical power of optics block 104.

FIG. 8A shows an example of VR headset 100 providing autofocus for frame n of a virtual scene. In this example, virtual scene includes object 806 displayed on electronic display 102 at which the gaze of user 800 is directed (i.e., verged). A virtual image of object 806 is located a virtual distance $d_i$, behind electronic display 102, from exit pupil 810. In the example of FIG. 8A, optics block 104 is in position $p_i$, which provides accommodation for distance $d_i$ to enable comfortable viewing of object 806.

FIG. 8B shows VR headset 100 providing autofocus for a subsequent frame n+1 of the virtual scene. In this example, user 800 may have repositioned its eyes to look at object 808 or object 808 quickly moved toward user 800 in the virtual scene. As a result, the virtual image of object 808 is located close to electronic display 102. In response to the location of object 808 close to the electronic display 102, which is closer than object 806 in FIG. 8A), eyes of user 800 rotate inward to verge on object 808, causing vergence processing module 112 to determine a new vergence depth for frame n+1 and to provide the new vergence depth to varifocal actuation block 106. Based on the new vergence depth, varifocal element 802 moves optics block 104 from position $p_i$ to new position $p_f$ to accommodate user 800 at the new vergence depth $d_f$ for the closer object 808.

In one example, each state of optics block 104 corresponds to a focal length and eye position, provides accommodation for a range of vergence depths, and is associated with a specific position of optics block 104. Accordingly, vergence depths may be mapped to positions of optics block 104 and stored in a lookup table. Thus, when a vergence depth is received from vergence processing module 112, varifocal actuation block 106 automatically moves optics block 104 to a position corresponding to the received vergence depth based on the lookup table.

In many instances, virtual reality systems aim to present users with a virtual environment that closely simulates a real world environment or provides users with content causing the users to get lost in the illusion created by the virtual reality systems. To provide users with a realistic or captivating virtual environment, a virtual reality system implements multiple systems and methods discussed herein to operate together at efficiencies that are imperceptible to a user. For example, transition delays are particularly costly to user experience with virtual reality systems. If a user is waiting for the virtual scene presented by a VR headset to catch up to what the user's brain is already expecting, the illusion is broken and/or the user may get nauseous. However, processing speeds and commercially available actuators are currently faster than the coordination of the human eye to change the shape of its lens and the human brain to register what the new shape of the lens is focused on, allowing the disclosed systems and methods to provide users with high-quality virtual environments.

Referring back to FIGS. 8A and 8B to provide accommodation for a new vergence depth while also leaving time to perform additional calculations without users perceiving a delay, a speed at which varifocal element 802 moves optics block 104 is limited by a rate at which the human eye performs accommodation. For example, assuming human eye accommodation has a 10 diopter/sec peak velocity, 100 diopter/sec$^2$ peak acceleration, and changing the distance between electronic display 102 and optics block 104 moves a virtual image about 0.5 diopters/mm, varifocal element 802 operates with a minimum velocity of 10/0.5=20 mm/sec and a minimum acceleration of 100/0.5=200 mm/sec$^2$ acceleration to prevent a user from perceiving the repositioning of optics block 104 relative to electronic display 102. There are commercially available actuators satisfying the preceding values.

Figure 9A:
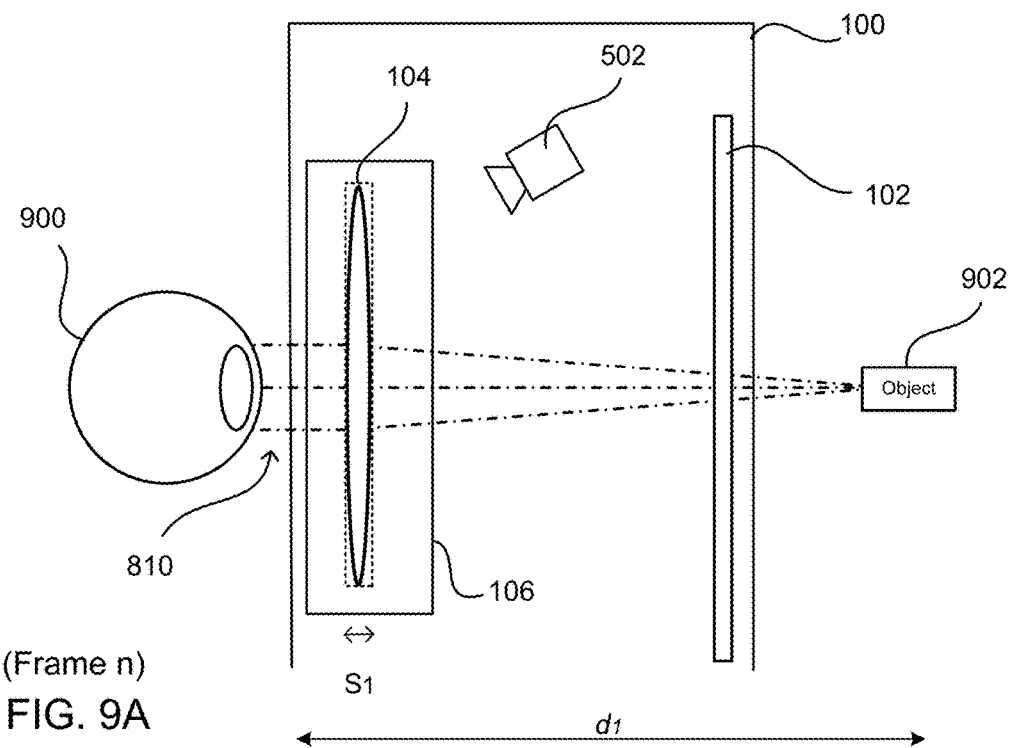
FIGS. 9A and 9B show an example process for adjusting the focal length by changing the shape or optical path length of the optics block of a virtual reality headset using a varifocal element, in accordance with at least one embodiment.
Figure 9B:
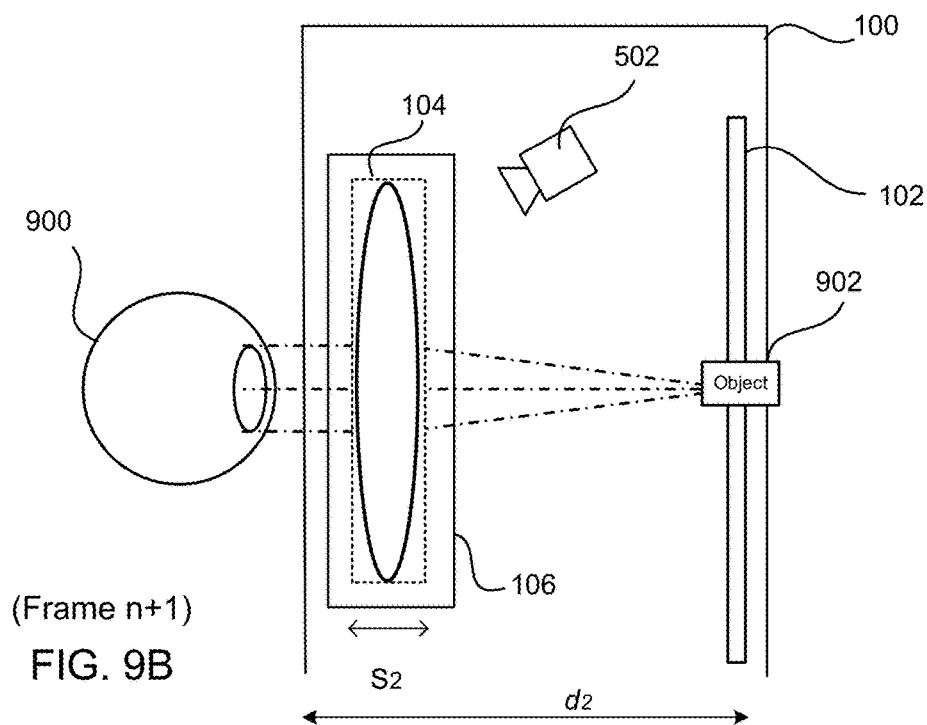

FIGS. 9A and 9B show an alternative example process for adjusting the focal length of optics block 104 with a varifocal element by changing the shape of one or more lenses in optics block 104. Similarly to the example of FIGS. 8A and 8B, FIG. 9A shows an example of VR headset 100 providing autofocus for a frame n of a virtual scene that includes object 902 displayed on electronic display 102 at which the gaze of user 900 is directed (e.g., verged). A virtual image of object 902 is similarly located a virtual distance $d_1$, which is behind electronic display 102, from exit pupil 810. In the example of FIG. 9A, varifocal actuation block 106 changes the shape of one or more lenses of optics block 104 to provide accommodation for distance $d_i$ with lens shape $S_1$ to enable comfortable viewing of object 902.

FIG. 9B shows VR headset 100 providing autofocus for a subsequent frame n+1 of the virtual scene, by changing the shape of one or more lenses of optics block 104. In this example, object 902 has moved toward user 900 from distance $d_1$ to $d_2$ in the virtual scene, causing a change in vergence and necessitating a complementary adjustment in accommodation. Accordingly, vergence processing module 106 determines a new vergence depth for frame n+1 and provides the new vergence depth to varifocal actuation block 106, which changes the shape of one or more lenses of optics block 104 from shape $S_1$ to new lens shape $S_2$ to accommodate user 900 at the new closer vergence depth $d_2$.

As described above, different states of optics block 104 correspond to various focal lengths, provide accommodation for a range of vergence depths, and are associated with a lens shape or other adjustable property affecting focal length. Accordingly, vergence depths can be mapped to lens shapes or properties and stored in a lookup table. Thus, when a vergence depth is received from vergence processing module 112, varifocal actuation block 106 identifies a lens shape corresponding to the vergence depth from the lookup table and changes the shape of one or more lenses in optics block 104 to the identified lens shape corresponding to the new vergence depth. As described above in conjunction with FIG. 1, varifocal actuation block 106 may include one or more components to change the shape or other property affecting the focal length of one or more lenses of optics block 104. Example components for changing the shape of one or more lenses include: shape-changing polymer lenses, liquid lenses with electrowetting, Alvarez-Lohmann lenses, deformable membrane mirrors, liquid crystal (electroactive) lenses, phase-only spatial light modulator (SLM), and other suitable components.

Returning to FIG. 4, depth of field blur is determined 420 for the virtual scene. To determine 420 depth of field blur, a point within the scene presented to the user by the VR headset 100 where the user's gaze is directed is determined, and optics block 104 is configured to a state in which the point within the scene where the user's gaze is directed is brought into focus for the user. Depth of field blur is then determined 420 relative to the point within the scene where the user's gaze is directed. In one example, the depth within the scene geometry (e.g., distances within the virtual scene) corresponding to the filtered vergence depth is determined as the plane of focus for the frame of the virtual scene. Accordingly, objects or features of the virtual environment with distances within the virtual scene greater or less than a distance of the plane of focus from the user's eyes may be rendered with synthetic blur. In another example, the depth of field blur is determined based on an object in the scene on which the user's gaze is focused at the depth corresponding to the filtered vergence depth (i.e., a "focal object"). Thus, the focal object, rather than the plane of focus, provides a reference point to identify other objects in the scene that are rendered with depth of field blur, even if the other objects have a similar depth in the scene as the focal object.

The blur may be progressive, with as a level of blur applied to objects or features based on a distance of the objects or features from the plane of focus (or object of focus), or a generally uniform level of blur may be applied to objects or features in the virtual scene. Depth of field blur is a natural consequence of binocular vision, so including depth of field blur in the virtual scene furthers to the illusion of the virtual scene by providing the user with an expected depth cue, which may enhance the user experience with the virtual scene. Further, the blur may be based at least in part on measured properties of the user's eye. For example, wavefront aberrations of the user's eye could be measured by a wavefront aberrometer, with depth of field blur based at least in part on the measured wavefront aberrations. Example wavefront aberrations of the user's eye may include higher-order aberrations not typically corrected by eye glasses, contact lenses, or refractive surgery. Accounting for properties of the user's eye when determining the depth of field blur may improve user comfort when viewing the scene.

The frame of the virtual scene corresponding to the portion of the virtual scene being viewed by the user is displayed 422 on electronic display 102 with a distortion correction to correct optical error caused by the determined state of optics block 104 and with depth of field blur based on the filtered vergence depth. Further, varifocal actuation block 106 has changed the focus of optics block 104 to provide focus and accommodation to the location in the portion of the virtual scene where the user's eyes are verged. In various embodiments, the process 400 may include additional steps or perform steps in different orders than the order described in conjunction with FIG. 4.

In various embodiments, operation of varifocal actuation block 106 is based at least in part on characteristics of a user's vision. For example, optics block 104, varifocal actuation block 106 and scene rendering module 120 compensate for one or more characteristics of the user's vision when a scene is presented to the user. Example characteristics of a user's vision that may be compensated or otherwise accounted for by varifocal actuation block 106 include refractive errors (e.g., eyeglass prescription) and accommodation range (e.g., presbyopia, myopia, hyperopia or astigmatism). For example, if a user has a refractive error of +1 D spherical power, then optics block 104 is configured to a state that corrects the user's refractive error and maintain focus, as well as maintains focus of objects within the scene at which the user is looking. Additionally, varifocal actuation block 106 and scene rendering module 120 may account for the user's specific accommodation range (near to far distances with correction) when determining 420 depth of field blur. For example, users with presbyopia have a reduced range of accommodation, so varifocal actuation block 106 may provide a limited number of states of optics block 104 that account for a limited number of focal lengths or otherwise account for a user's range of accommodation. Accommodation range and refractive errors may be specified by the user or may be obtained from information associated with the user, such as digital medical records of the user that the user has authorized one or more components of the VR system environment to access. Alternatively, lens assemblies or other components may be coupled to VR headset 100 to correct user's vision while using the VR headset 100 instead of eyeglasses. If lens assemblies are coupled to VR headset, 100, the lens assemblies may be separately calibrated to adjust the correlation between states of optics block 104 and various distortion corrections. Further, varifocal actuation block 106 may adjust the cylindrical power and axis of VR headset 100 to compensate for astigmatism as well as adjust a spherical power of VR headset 100. For example, varifocal actuation block 106 rotates rotating two cylindrical lenses relative to one another to adjust the cylindrical power of VR headset 100.

Optical Calibration

Display of a scene by VR headset 100 is modified to mitigate distortion introduced by optical errors of optics block 104 included in VR headset 100 that directs image light from electronic display element 102 presenting the scene to an eye of a user. A distortion correction is applied to the scene that pre-distorts the scene, and distortion caused by optics block 140 compensates for the pre-distortion as light from the modified scene passes through optics block 104. Hence, the scene viewed by the user is not distorted.

Accordingly, distortion corrections account for different levels and types of distortion caused by different eye positions relative to optics block 104 or different focal lengths of optics block 140. Accordingly, the distortion corresponding to different potential eye positions relative to optics block 104 and at potential focal lengths of optics block 104 is determined by measuring a wavefront (i.e., propagation of points of the same phase) of light from the electronic display element after the light has passed through the optics block. A wavefront sensor, such as a Shack-Hartmann sensor, may be used to measure the wavefront. A Shack-Hartmann sensor comprises an array of lenses, each focused onto a sensor, such as a CCD or CMOS array, based on a focal location on the sensor, a local tilt (or deviation of a beam of light) of the wavefront across each lens is calculated and the local tilts are combined to approximate a wavefront. However, using a Shack-Hartmann sensor merely approximates the wavefront for a single viewing angle.

Figure 10:
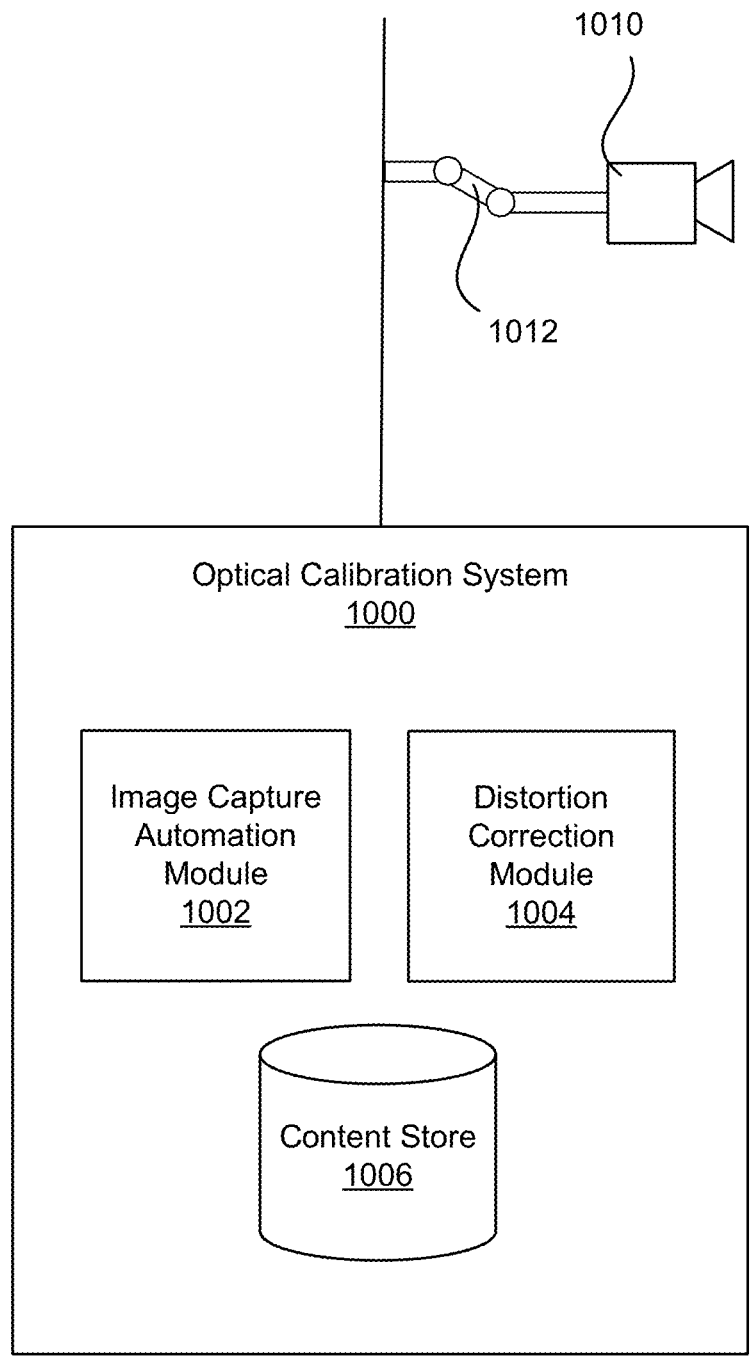
FIG. 10 shows an example optical calibration system, in accordance with at least one embodiment.

FIG. 10 shows one embodiment of optical calibration system 1000 for generating distortion correction maps for various locations of an eye relative to optics block 104 and various states of optics block 104 of VR headsets 100 having multiple, variable focal lengths. However, distortion correction maps may also generated for VR headsets 100 having a single focal length to correct distortion caused by different positions of a user's eye relative to optics block 104. Different eye positions relative to optics block 104 and different states of optics block 104 cause different degrees of optical error in light directed through optics block 104. This optical error distorts light from electronic display element 102 included in VR headset 100, which may impair presentation of a virtual scene to a user. Accordingly, optical calibration system 1000 generates distortion correction maps to correct for optical error introduced by different states of optics block 104, which accounts for different focal lengths caused by optics block 104. In the example of FIG. 10, optical calibration system 1000 includes image capture automation module 1002, distortion correction module 1004, content store 1006, camera 1010, and mechanical arm 1012. However, in alternative configurations, different and/or additional components may be included in optical calibration system 1000.

Figure 11:
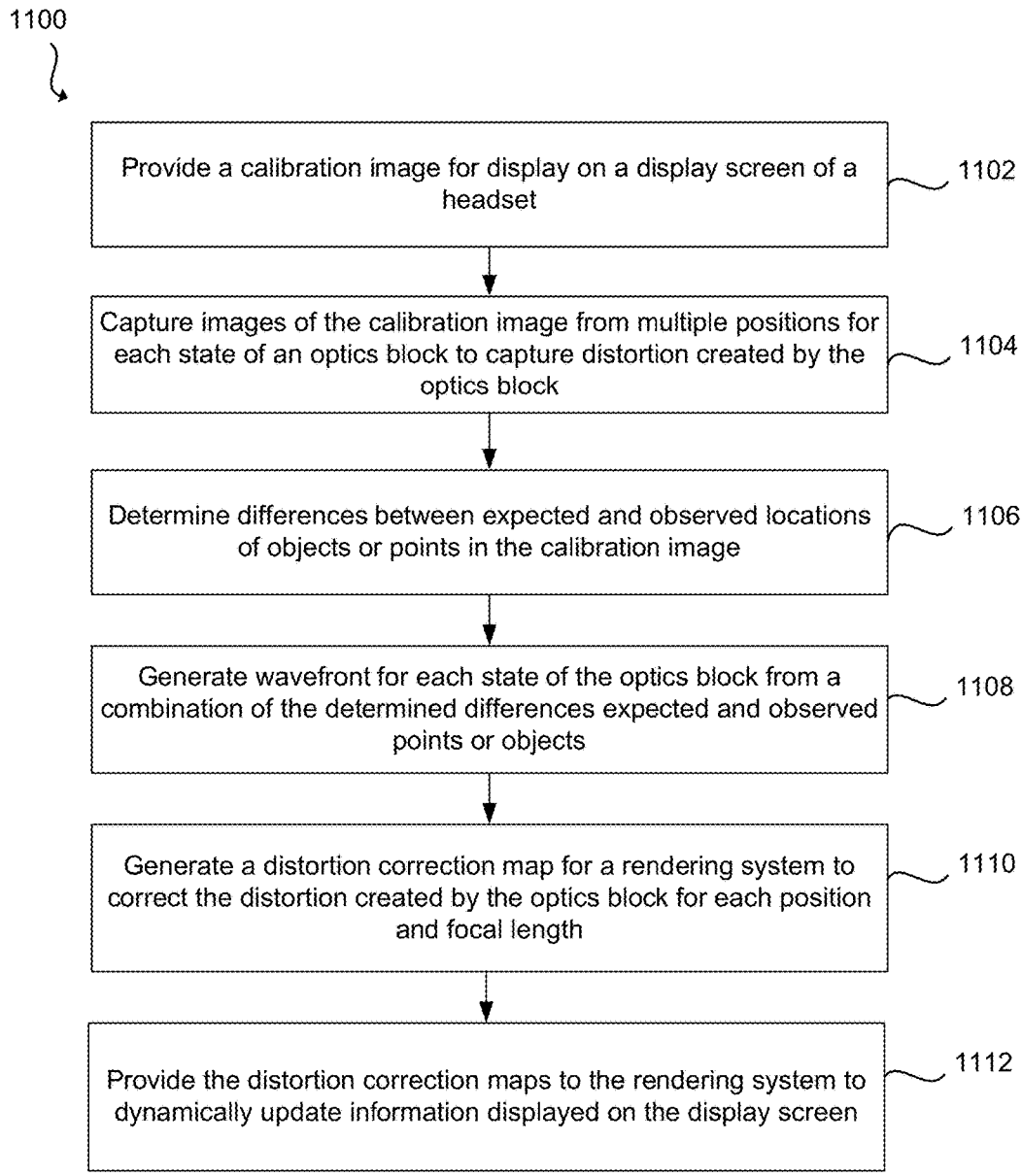
FIG. 11 shows an example process for calibrating a virtual reality headset to correct for distortion created by an optics block of the virtual reality headset, in accordance with at least one embodiment.
Figure 12A:
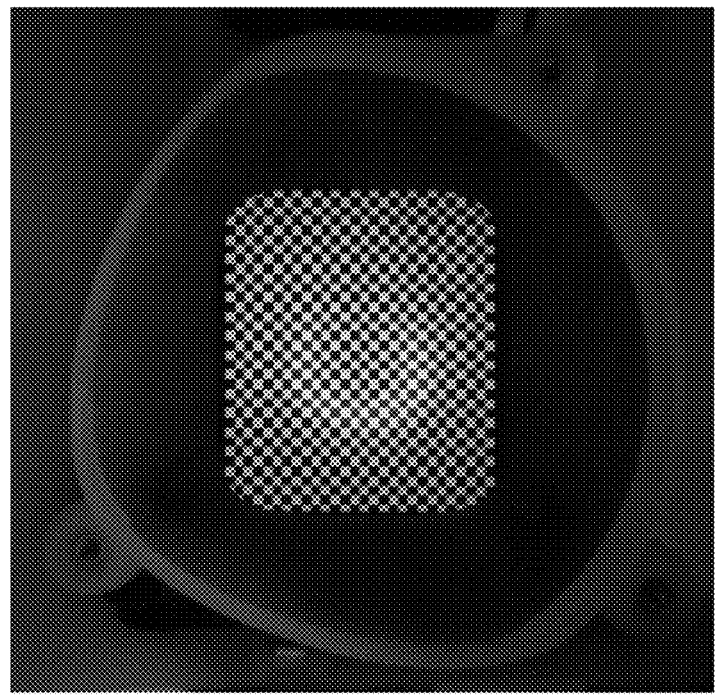
FIG. 12A shows an example undistorted calibration image displayed on an electronic display element of a virtual reality headset without an optics block, in accordance with at least one embodiment.
Figure 12B:
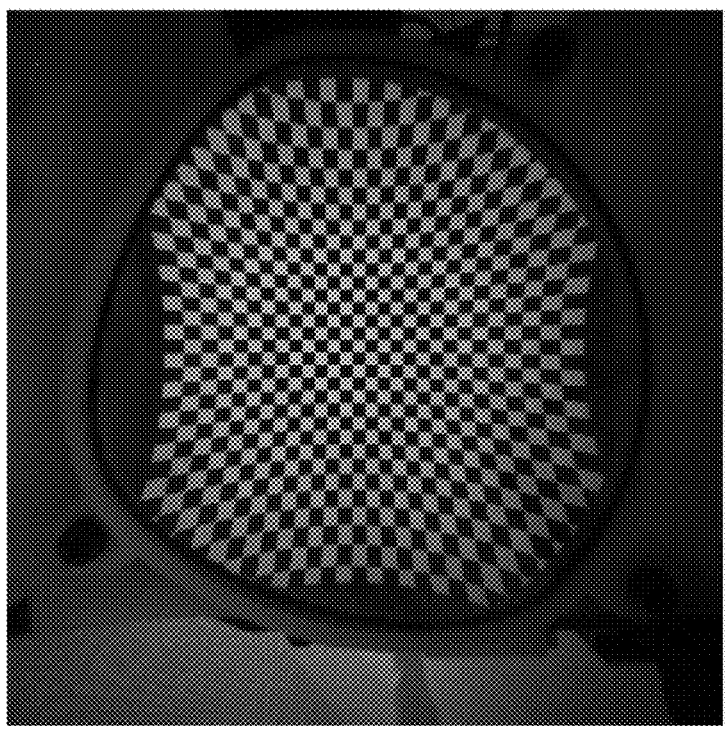
FIG. 12B shows an example distorted calibration image displayed on an electronic display element of a virtual reality headset with an optics block, in accordance with at least one embodiment.

FIG. 11 shows one embodiment of process 1100 for calibrating VR headset 100 to correct for distortion created by optics block 104. Although discussed in the context of VR headset 100 capable of being configured to have different focal lengths, process 1100 may also be used to correct for distortion caused by different positions of a user's eye relative to optics block 104 in VR headsets 100 having a single, or fixed, focal length. To measure distortion created by optics block 104, a calibration image is provided 1102 for display on electronic device 102 of VR headset 100. The calibration image includes a known and predictable pattern, such a checkerboard pattern or an array of points or dots. FIG. 12A shows an example checkerboard calibration image 1202A displayed on electronic display element 102 of VR headset 100. In the example of FIG. 12A, optics block 104 of VR headset 100 has been removed to show calibration image 1202A undistorted. In contrast, FIG. 12B shows an example distorted calibration image 1202B displayed on electronic display element 102 of VR headset 100. In FIG. 12B, optics block 104 is included in VR headset 100 to show how distortion caused by optics block 104 distorts calibration image 1202A in FIG. 12A to distorted calibration image 1202B.

Figure 13A:
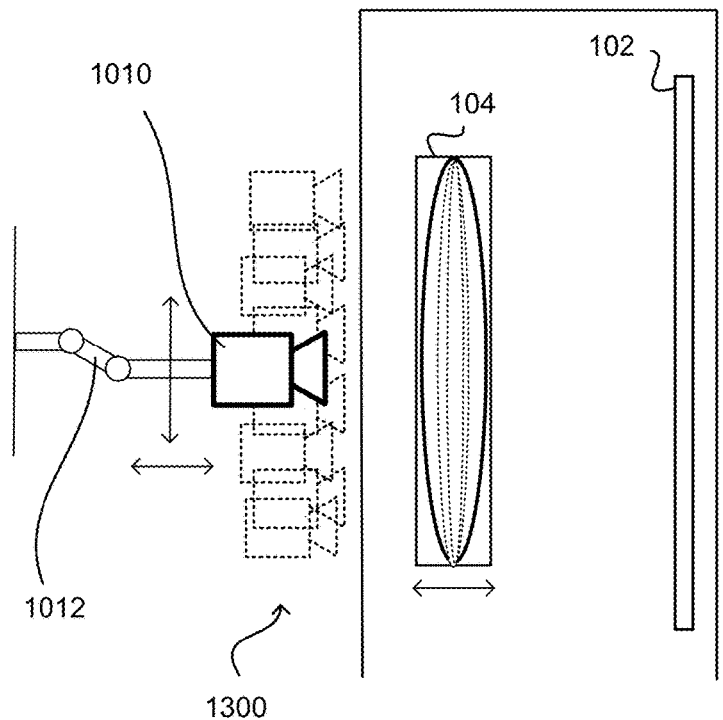
FIGS. 13A and 13B show an example process for calibrating a virtual reality headset by initially capturing images from multiple positions of a pattern displayed by the virtual reality headset, in accordance with at least one embodiment.
Figure 13B:
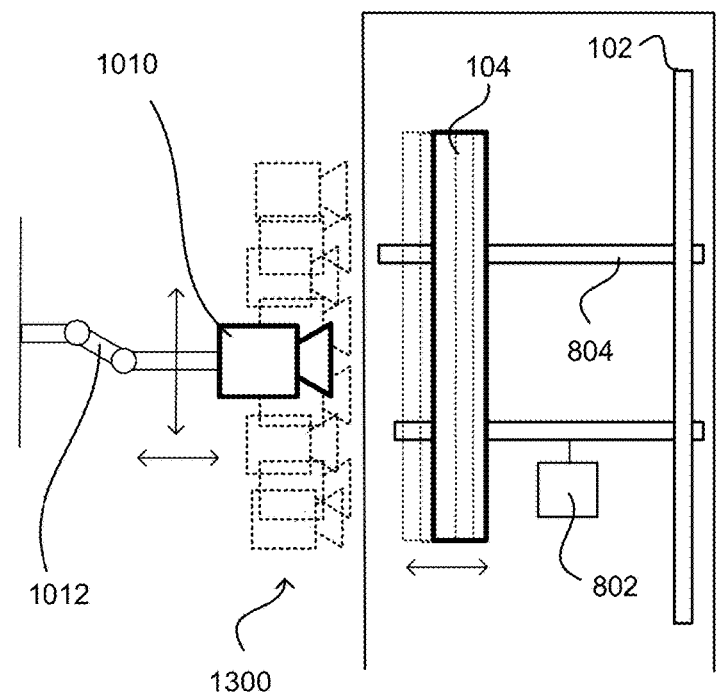

Images of the calibration image as the calibration image appears from the exit pupil of VR headset 100 are captured 1104 using camera 1010, which is capable of capturing wide angle images at a relatively high resolution and long focal length (e.g., a single lens reflex camera). Depending on the desired accuracy, the number of images captured of the calibration image may vary. Assuming a maximum degree of accuracy is desired for a 3D virtual scene, multiple images corresponding to at least a threshold number of potential positions from which a user could view electronic display 102 through optics block 104 are captured 1104. FIGS. 13A and 13B show an example process for capturing images of a calibration image displayed on electronic display 102 from multiple positions 1300. FIG. 13A shows images of a calibration image being captured from multiple positions 1300 for different shapes of optics block 104, corresponding to images for different states and focal lengths of optics block 104. Similarly, FIG. 13B shows images of the calibration image being captured from multiple positions 1200 for different positions of optics block 104. Thus, multiple images of the calibration image are captured from various positions around the exit pupil for each of the different focal lengths of optics block 104 to observe the distortion created by optics block 104 from various angles at various focal lengths.

To reduce time associated with image capture and provide an accurate and repeatable process for capturing images of the calibration image, images of the calibration image may be captured using a robotic mechanical arm 1012 and a computer numerical control (CNC) process or machine. For example, image capture automation module 1002 includes logic and instructions that automates movement of mechanical arm 1012 to capture images of the pattern displayed on VR headset 100 from different positions. Accordingly, in one example, images of the calibration image are captured from multiple preselected positions relative to or around the exit pupil and robotic mechanical arm 1012. Image capture automation module 1002 includes instructions for capturing image from the preselected positions for different states of optics block 104, allowing images of the calibration image to be accurately captured from the preselected positions for different states of optics block 104. In one example, the preselected positions form a 25×25 array or grid across calibration image, so 625 images are captured for each state of the optics block.

After capturing 1104 images of the calibration image, differences between the expected locations of the pattern in the calibration image relative to observed locations of the pattern in the images of the distorted calibration image captured from the exit pupil after light from the calibration image passes through optics block 104 are determined 1106. Displacements, or "tilts," between one or more points in the distorted calibration image and in the calibration image are determined by comparing the distorted calibration image to the calibration image (or other data identifying expected locations of the one or more points) for each camera position. Accordingly, the different camera positions allow determination of a wavefront, while providing a greater sensitivity and a greater field of view than a Shack-Hartmann sensor or other wavefront sensors.

The field of view of camera 1010 is wide enough to allow capture of the entire calibration image in a single high resolution image at each camera position, allowing more granular displacement measurements than conventional wavefront sensors such as Shack-Hartmann sensors. Referring to FIGS. 12A and 12B, each box of the checkerboard pattern of distorted calibration image 1200B can be compared to the ideal or theoretical positions of the boxes in calibration image 1200A to determine the displacements, as the distorted calibration image 1200B is completely within the field of view of camera 1010. Additionally, the higher resolution of camera 1010 relative to conventional wavefront sensors allows the camera 1010 to measure higher pixel displacement at an angular displacement relative to pixel displacement at the same angular displacement measured by conventional wavefront sensors, such as Shack-Hartmann sensors. Further, multiple camera positions provide multiple points for determining displacements, or "tilts," between one or more points in the distorted calibration image and in the calibration image.

Figure 14:
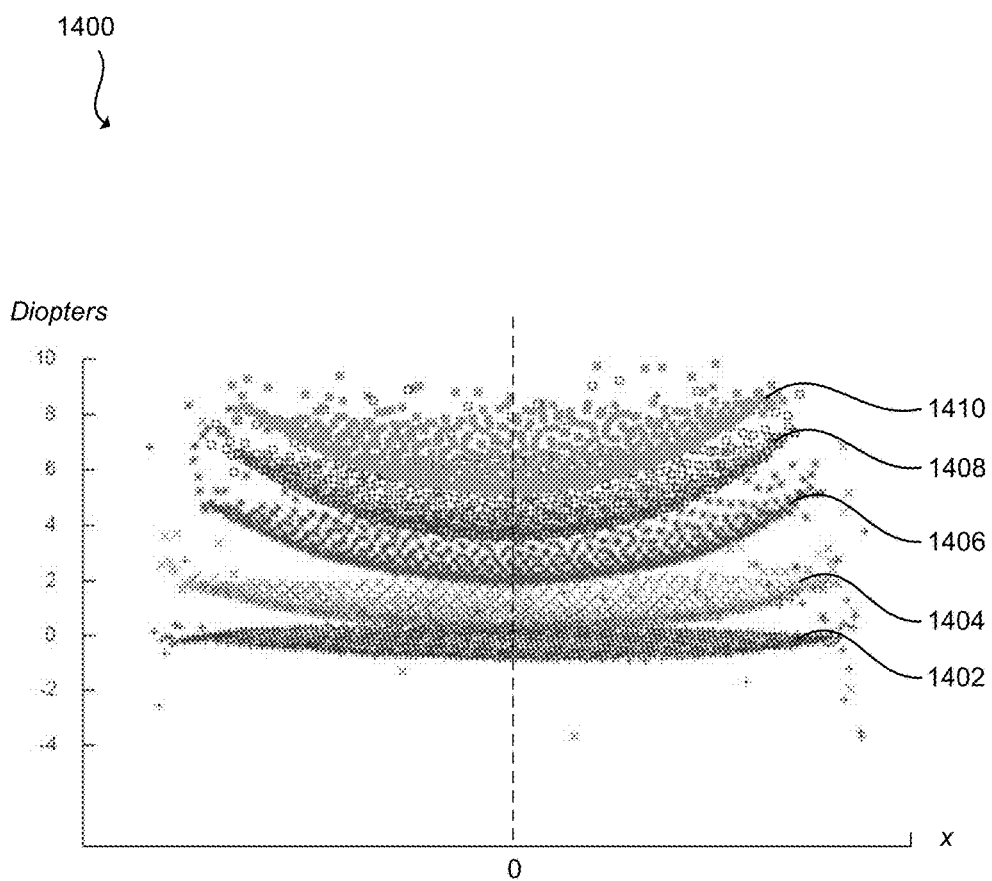
FIG. 14 shows multiple example wavefronts corresponding to different focal lengths for an optics block of a virtual reality headset including a varifocal element, in accordance with at least one embodiment.

Referring back to FIG. 11, the wavefront is generated 1108 for each state of optics block 104. For example, distortion correction module 1004 receives the images of distorted calibration image as it appears through the other end of optics block 104 and determines differences between the expected locations of points of the calibration image the pattern relative to observed locations of the corresponding points of the distorted calibration image. Based on the differences, distortion correction module 1004 estimates changes to the wavefront of light from electronic display 102 as the wavefront passes though optics block 104. For example, wavefront slopes for each state are computed from the displacements for a least-squares fitting with derivatives of Zernike polynomials. FIG. 14 shows example plot 1400 showing multiple reconstructed wavefronts from different focal lengths of VR headset 100 capable of being configured to operate using multiple focal lengths. Each wavefront 1402, 1404, 1406, 1408, and 1410 corresponds to a different position of a user's eye relative to an exit pupil of VR headset 100 or focal length of optics block 104. In this example, wavefronts 1402, 1404, 1406, 1408, 1410 corresponding to different positions or focal lengths of optics block 104 have different shapes, corresponding to different levels of distortion. For example, wavefront 1402 is relatively uniform, varying from approximately 0.25 diopters at the center of optics block 104 to 0 diopters at the edges of optics block 104. However, wavefront 1406 varies from 2.0 diopters at the center of optics block 104 to about 5.0 diopters at the edges of the optics block 104. Additionally, information about the wavefront can be interpolated for camera positions for which images of calibration image was not captured using the data shown in FIG. 14, allowing determination of a continuous model or function of wavefront. Such a model or function allows distortion corrections to be provided for potential eye positions relative to the exit pupil at a high granularity based on a set of discrete points corresponding to camera positions.

Again referring to FIG. 11, distortion correction module 1004 generates 1110 a distortion correction map for a state of optics block based on the wavefront (e.g., based on a wavefront at the exit pupil after image light passes through optics block 104) and determined differences between the expected locations of points of the calibration image relative to observed locations of the corresponding points in the distorted calibration image captured as light from electronic display 102 passes through optics block 104. The distortion correction map provides scene render module 120 with instructions for adjusting the rendering of the virtual scene while optics block 104 is in the state.

Accordingly, the distortion correction can be considered pre-distortion that is corrected by distortion inherent to the VR headset 100 to provide a virtual scene with no apparent optical errors. Hence, distortion correction maps corresponding to various states of optics block 104 are provided 1112 to scene render module 120 to modify information displayed on electronic display 102 to compensate for distortion caused by optics block 104.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method comprising:
    instructing a head mounted display (HMD) to display a calibration image on a display of the HMD, the HMD including an optics block configured to focus light from the display to an exit pupil of the HMD;
    capturing images of the displayed calibration image via a camera at the exit pupil from a plurality of positions;
    determining, for each image, differences between expected locations of features of the calibration image and locations of the corresponding features in the image of the displayed calibration image captured via the camera;
    generating a distortion correction map for at least a set of the plurality of positions, the distortion correction map correcting distortion caused by one or more optical errors inherent to the optics block; and
    providing the generated distortion correction maps corresponding to the plurality of positions to a rendering system of the HMD, each distortion correction map modifying information displayed on the display to compensate for the distortion caused by the optics block.

2. The method of claim 1, wherein capturing images of the displayed calibration image via the camera at the exit pupil from the plurality of positions of the camera relative to the exit pupil comprises:
    moving a robotic arm coupled to the camera to position the camera in different positions at the exit pupil.

3. The method of claim 1, further comprising:
    instructing an eye tracking system of the HMD to determine a current position of each eye of a user relative to the exit pupil;
    instructing the rendering system of the HMD to select a distortion correction map for the current position of each eye relative to the exit pupil from the provided distortion correction maps;
    instructing the rendering system of the HMD to apply the selected distortion correction map for the current position of each eye relative to the exit pupil to image data; and
    instructing the display to display the image data for focusing to the exit pupil by the optics block after application of the selected distortion correction map.

4. The method of claim 3, further comprising:
    instructing the eye tracking system of the HMD to track each eye of the user to an updated position;
    instructing the rendering system of the HMD to select an alternative distortion correction map for the updated position of each eye of the user relative to the exit pupil from the provided distortion correction maps;
    instructing the rendering system of the HMD to apply the alternative distortion correction map for the updated position of each eye relative to the exit pupil to image data; and
    instructing the display to display the image data for focusing to the exit pupil by the optics block after application of the alternative distortion correction map.

5. The method of claim 1, wherein generating the distortion correction map for at least the set of the plurality of positions relative to the exit pupil comprises:
    determining distortion correction maps for positions between positions in the set of the plurality of positions by interpolating distortion correction maps for multiple positions in the set of the plurality of positions.

6. The method of claim 1, wherein the distortion correction map based on the determined differences between expected locations of objects in the calibration image and locations of the corresponding objects in one or more images captured via the camera at the position relative to the exit pupil is based at least in part on a wavefront from the optics block at the position relative to the exit pupil.

7. The method of claim 1, wherein the camera is a camera having a field of view capable of including the displayed calibration image its entirety from each of the plurality of positions relative to the exit pupil, and wherein the plurality of positions relative to the exit pupil include a plurality of different distances from the exit pupil and a plurality of different viewing angles relative to the exit pupil.

8. A method comprising:
    capturing images of a calibration image displayed on a display from a plurality of positions at an exit pupil, light of the calibration image being directed from the display through an optics block configured to provide a plurality of focal lengths to the exit pupil;
    determining, for each image, one or more differences between expected locations of features of the calibration image and locations of the corresponding features of in the image of the displayed calibration image captured via the camera at the exit pupil; and
    generating a distortion correction map for at least a set of focal lengths of the optics block, the distortion correction map for a focal length of the optics block
        (1) being generated based on the determined differences between expected locations of features of the calibration image and locations of the corresponding features of in one or more images captured via the camera at the exit pupil from one or more positions relative to the exit pupil for the focal length of the optics block, and
        (2) correcting distortion created by the optics block at the focal length.

9. The method of claim 8, further comprising:
    providing distortion correction maps for one or more of the set of focal lengths of the optics block to a rendering system, each distortion correction map modifying information displayed on the display to compensate for the distortion based at least in part on the focal length of the optics block.

10. The method of claim 9, further comprising:
    instructing the rendering system to determine a current focal length of the optics block;
    instructing the rendering system to select a distortion correction map for the current focal length of the optics block from the provided distortion correction maps;
    instructing the rendering system to apply the selected distortion correction map for the current focal length to image data; and
    instructing the display to display the image data for focusing to the exit pupil by the optics block after application of the selected distortion correction map.

11. The method of claim 10, further comprising:
    instructing a varifocal system to adjust the current focal length of the optics block;
    instructing the rendering system to select an alternative distortion correction map for the adjusted current focal length of the optics block from the provided distortion correction maps;

instructing the rendering system to apply the alternative distortion correction map for the adjusted current focal length to image data; and instructing the display to display the image data for focusing to the exit pupil by the optics block after application of the alternative distortion correction map.

12. The method of claim 9, wherein capturing images of the calibration image displayed on the display from a plurality of positions relative to the exit pupil comprises:

moving a robotic arm coupled to the camera to position the camera in different positions relative to the exit pupil.

13. The method of claim 8, wherein the display and optics block are included in a virtual reality (VR) HMD.

14. The method of claim 8, wherein the plurality of positions include a plurality of different distances from the exit pupil and a plurality of different viewing angles relative to the exit pupil corresponding to potential eye positions.

15. A system comprising:

a virtual reality (VR) headset configured to display a calibration image on a display, the VR headset including an optics block configured to focus light from the display to an exit pupil and to provide a plurality of focal lengths;

a camera configured to capture images of the calibration image displayed by the display of the VR headset from a plurality of positions of the camera relative to the exit pupil and for each of the plurality of focal lengths of the optics block and each of a plurality of eye positions; and a calibration system configured to:

(1) determine, for each image, one or more differences between expected locations of features in the calibration image and locations of the corresponding features in each image captured via the camera at the exit pupil;

(2) generate distortion correction maps for at least a set of the focal lengths of the optics block from the captured images of the calibration image, a distortion correction map for a focal length (1) being generated based on the determined differences, and (2) correcting distortion created by the optics block at the focal length in a virtual scene rendered with pre-distortion.

16. The system of claim 15, further comprising:

a robotic arm coupled to the camera and configured to move the camera to the plurality of positions relative to the exit pupil.

17. The system of claim 15, wherein the calibration system is configured to provide distortion correction maps for one or more of the set of focal lengths of the optics block to a rendering system configured to instruct the display of the VR headset to present a virtual scene.

18. The system of claim 17, wherein the rendering system is further configured to determine a current focal length of the optics block, to select a distortion correction map corresponding to the current focal length, and to instruct the display of the VR headset to present the virtual scene on the display subject to the selected distortion correction map.

19. The system of claim 15, wherein the VR headset further includes a varifocal system configured to change a state of the optics block to change the focal length of the optics block.

20. The system of claim 19, wherein the varifocal system is configured to change the state of the optics block by adjusting a distance between the optics block and the display.

* * * * *